United States Patent [19]

Kawasaki et al.

[11] Patent Number: 5,600,553
[45] Date of Patent: Feb. 4, 1997

[54] FUZZY CONTROL APPARATUS

[75] Inventors: Somei Kawasaki, Tokyo; Toshihiko Kubo, Kawasaki, both of Japan

[73] Assignee: Canon Kabushiki Kaisha, Tokyo, Japan

[21] Appl. No.: 882,620

[22] Filed: May 13, 1992

[30] Foreign Application Priority Data

| May 13, 1991 | [JP] | Japan | 3-107308 |
|---|---|---|---|
| May 14, 1991 | [JP] | Japan | 3-109221 |
| May 15, 1991 | [JP] | Japan | 3-110346 |

[51] Int. Cl.⁶ ............................................. G06F 19/00
[52] U.S. Cl. .................. 364/148; 364/167.01; 364/174; 395/3; 395/61; 395/900
[58] Field of Search .............................. 364/167.01, 148, 364/149–151, 152, 176, 160, 180, 426.01, 174; 318/561, 592–594; 395/61, 3, 900, 903, 904, 905

[56] References Cited

U.S. PATENT DOCUMENTS

| 4,852,007 | 7/1989 | Yasunobu et al. | 364/426.01 |
| 5,057,859 | 10/1991 | Ishimaru | 395/900 |
| 5,131,071 | 7/1992 | Tsutsumi et al. | 395/900 X |
| 5,138,554 | 8/1992 | Wada | 364/424.05 |
| 5,159,555 | 10/1992 | Wada | 364/424.05 |
| 5,167,005 | 11/1992 | Yamakawa | 395/900 X |
| 5,200,905 | 4/1993 | Uemoto et al. | 364/474.04 |
| 5,249,269 | 9/1993 | Nakao et al. | 395/900 X |
| 5,261,036 | 11/1993 | Nakano | 395/51 X |

OTHER PUBLICATIONS

Yasunobu et al. "Automatic Train Operation System by Predictive Industrial Applications of Fuzzy Control; Elsevier Fuzzy Control", Science Publishers Book (North Holland), 1985; pp. 1–18.

Primary Examiner—Joseph Ruggiero
Attorney, Agent, or Firm—Fitzpatrick, Cella, Harper & Scinto

[57] ABSTRACT

A driving control apparatus for controlling an object by a fuzzy inference comprises: a driving control object; a driver to drive the object; a first detector to detect position information of the object and to detect a remained distance from a movement target position of the object; a second detector to detect a speed corresponding to the remained distance detected by the first detector; and a controller to control the driver by the following fuzzy inference rules by using the remained distance and the speed:

Rule 1: IF remained distance=(large) THEN (−ΔE)
Rule 2: IF speed=(high) THEN (−ΔE) [(+ΔE) or (−ΔE) denotes a fuzzy set to express a drive information deviation amount.]

13 Claims, 23 Drawing Sheets

FUZZY CONTROL APPARATUS

BACKGROUND OF THE INVENTION

1. Field of the Invention

The invention relates to a fuzzy control apparatus using a fuzzy inference.

2. Related Background Art

Hitherto, for instance, a PID control shown in FIG. 2 is used to accurately drive a driving object to a target distance by using a motor or the like while keeping a target speed. FIG. 2 will now be described. A driving object is controlled by using a unit driving distance pulse (hereinafter, referred to as an PI pulse) which is generated every predetermined driving distance ΔD and a target distance DS in which a target arrival distance is shown by the number of predetermined driving distances ΔD. As driving state information which is used in the PID control, the following two data are used: remained distance data Z which is generated from a remained distance calculation circuit 1 for executing a calculation such as to subtract "1" from the target distance DS every generation of the PI pulse and reciprocal data 1/V of a speed which is generated from a speed calculation circuit 2 to count a generation time interval of the PI pulses by clocks (it is more accurate when a clock period is narrower). A PID control circuit section 3 will now be described. The PID control circuit section 3 comprises: a target speed pattern (or function) generating section 4, a proportional state discrimination section 5, a differential state discrimination section 6, and an integration state discrimination section 7. FIG. 3 shows a target speed pattern whose speed is determined by the remained distance. The target speed pattern is supplied to the proportional state discrimination section 5. The proportional state discrimination section 5 calculates $V_x/V_r$ from the remained distance data Z and the reciprocal data 1/V of the speed and the target speed pattern in order to make actual speed data $V_x$ and target speed $V_r$ proportional to a remained distance value $Z_x$. On the basis of the value of $V_x/V_r$, the state of speed is classified into five ranks: for example, "very fast", "fast", "indefinite", "slow", and "very slow". The proportional state discrimination section 5 generates driving control data with respect to each of the above five cases. It is a general way to decide the value of the driving control data to a positive or negative value while setting the rank of "indefinite" into "0". A "threshold value" among the ranks and the driving control data are set to constants, respectively. The driving control data is supplied to the integration state discrimination section 7. The integration state discrimination section 7 discriminates the number m of same values (same states) among the driving control data values as a state result which is discriminated from the result of the proportional state discrimination section and properly integrates and discriminates the driving control data and transmits the integration discrimination result to a driving circuit 8 to drive the motor. The driving control data which is generated here is set to a deviation amount for the preceding value (when the remained distance value is larger by "1"). The driving circuit 8 forms drive information for the motor. When the remained distance data is equal to "1", a brake flag is generated and the drive information is set into a braking state, thereby stopping the motor. It is desirable to set the stop position within a range of 0<Z<1. The drive information is sent to the differential state discrimination section 6. On the basis of the deviation amount from the preceding drive information value, a differential state of the speed is discriminated to see if it is in either one of the accelerating state, indefinite state, and decelerating state. On the basis of the result of the discrimination, the integration discrimination amount m is changed. The integration discrimination will now be described in more detail. When the integration discrimination amount is equal to or less than the constant m or when the output of the differential state discrimination section indicates "indefinite", the driving control data as an output of the proportional state discrimination section 5 is allowed to pass as it is. In the other cases, the driving control data is shifted by a certain predetermined amount. It is better to set the shifting direction into the plus direction during the deceleration and into the minus direction during the acceleration. The integration state discrimination section and the differential state discrimination section are needed to reduce a ringing ripple in the speed.

FIGS. 4 and 5 show driving speed patterns for the remained distance value to show the problem of the PID control which has been described above.

The speed pattern shown by a bold solid line of (i) in FIG. 4 indicates the result obtained in the case where the proportional discrimination, integration discrimination, and differential discrimination are set in the PID control in order to reduce an over-amount of the ringing or the like and the control is executed to a usual load. Since the proportional discrimination is optimistic, the speed is largely deviated from the target speed pattern in, particularly, a high speed zone ($Z>D_1$) and a decelerating zone ($D_2<Z<D_1$). Such a "deviation" in the decelerating zone is mainly caused by an inertia load of the driving system and the integration discrimination of the PID control. Therefore, as shown by a broken line (ii) in FIG. 4, not only the "deviation" in the decelerating zone in the over-load state further increases but also the speed just before the stop of the motor is largely "deviated" from the target speed, so that the stop position is deviated to Z<0 in dependence on the braking ability and such a state is unpreferable.

Since the proportional discrimination is optimistic, the motor is not controlled for a small speed fluctuation by a disturbance such as driving load fluctuation, power source voltage fluctuation, or the like, a stationary speed in the high speed zone ($>D_1$) is not maintained, and an operating efficiency for the driving object is not improved. The above problems are mainly caused since the proportional speed discrimination is optimistic. FIG. 5 shows a driving speed pattern in the case where a sensitivity of the proportional speed discrimination is raised. Although the deviation amounts from the target speed pattern in the high speed zone ($Z>D_1$) and decelerating zone ($D_2<Z<D_1$) are reduced in deed, a ringing occurs in the speed pattern as will be understood from the diagram. Although the ringing in the high speed zone does not cause a large problem, a portion of a very low speed occurs in the low speed zone ($Z>D_2$) by the ringing. The driving ability of the motor is generally not stable in such a very low speed portion and there is a case where the motor stops. The stop position cannot be guaranteed. Such a setting cannot be performed since it is obvious that the speed ringing exerts an adverse influence on the operating feeling. As mentioned above, the PID driving control has various drawbacks although it is a very simple control. The above problems will now be summarized again.

Problems of the PID control

1) When the state discrimination is enhanced (control is enhanced), a large speed ringing occurs.
2) When the state discrimination is weakened to prevent the speed ringing, a control range is narrowed for environmental changes (driving inertia load, power source voltage).

3) It is difficult to realize a control for a disturbance.

4) The driving control time is not stable for environmental changes.

SUMMARY OF THE INVENTION

It is an object of the invention to provide a fuzzy control apparatus in which by applying a special fuzzy production rule, a target speed pattern can be easily designed and it becomes hard to cause a ringing and a ripple.

The above and other objects and features of the present invention will become apparent from the following detailed description and the appended claims with reference to the accompanying drawings.

DETAILED DESCRIPTION OF THE PREFERRED EMBODIMENTS

Figure 1:
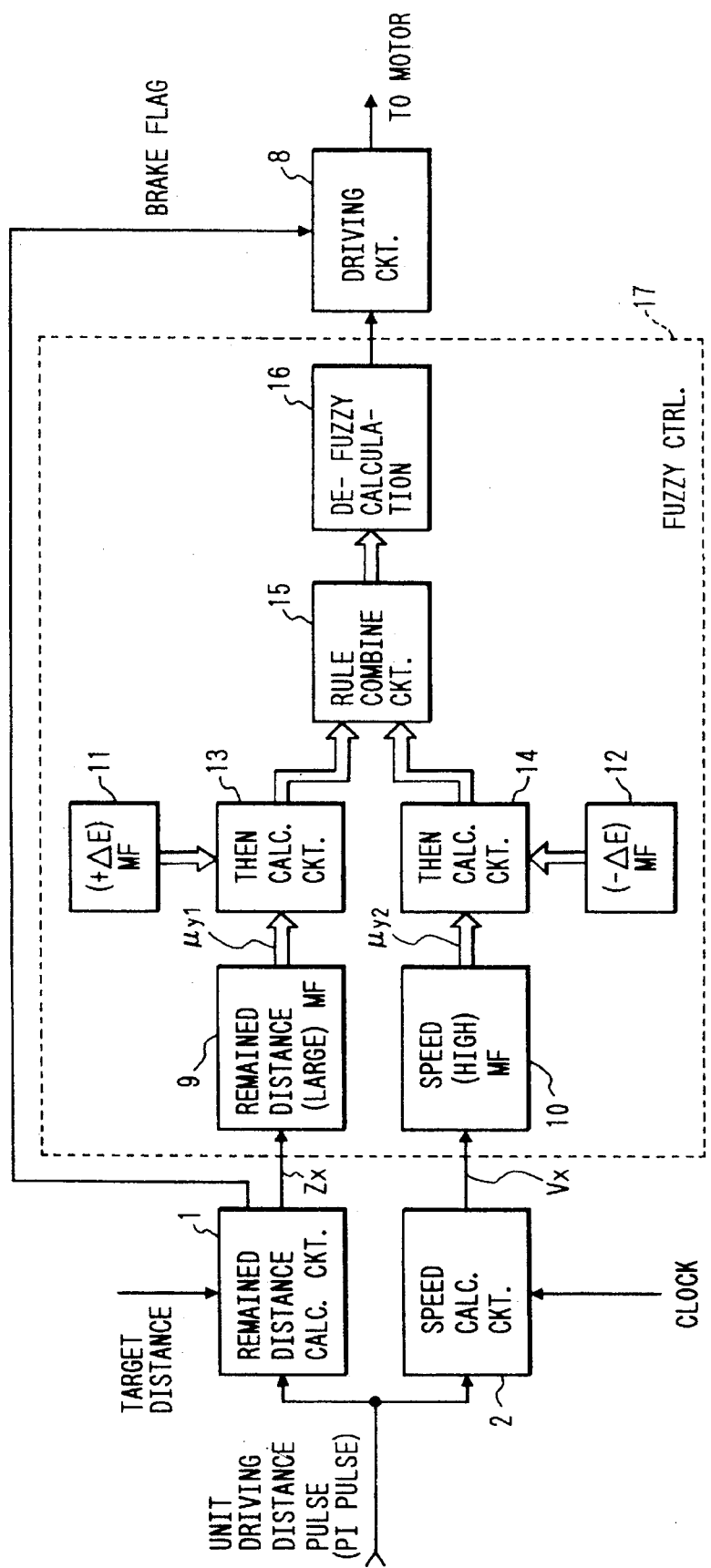
FIG. 1 is a block diagram showing a fuzzy driving control system according to the first embodiment of the invention.
Figure 2:
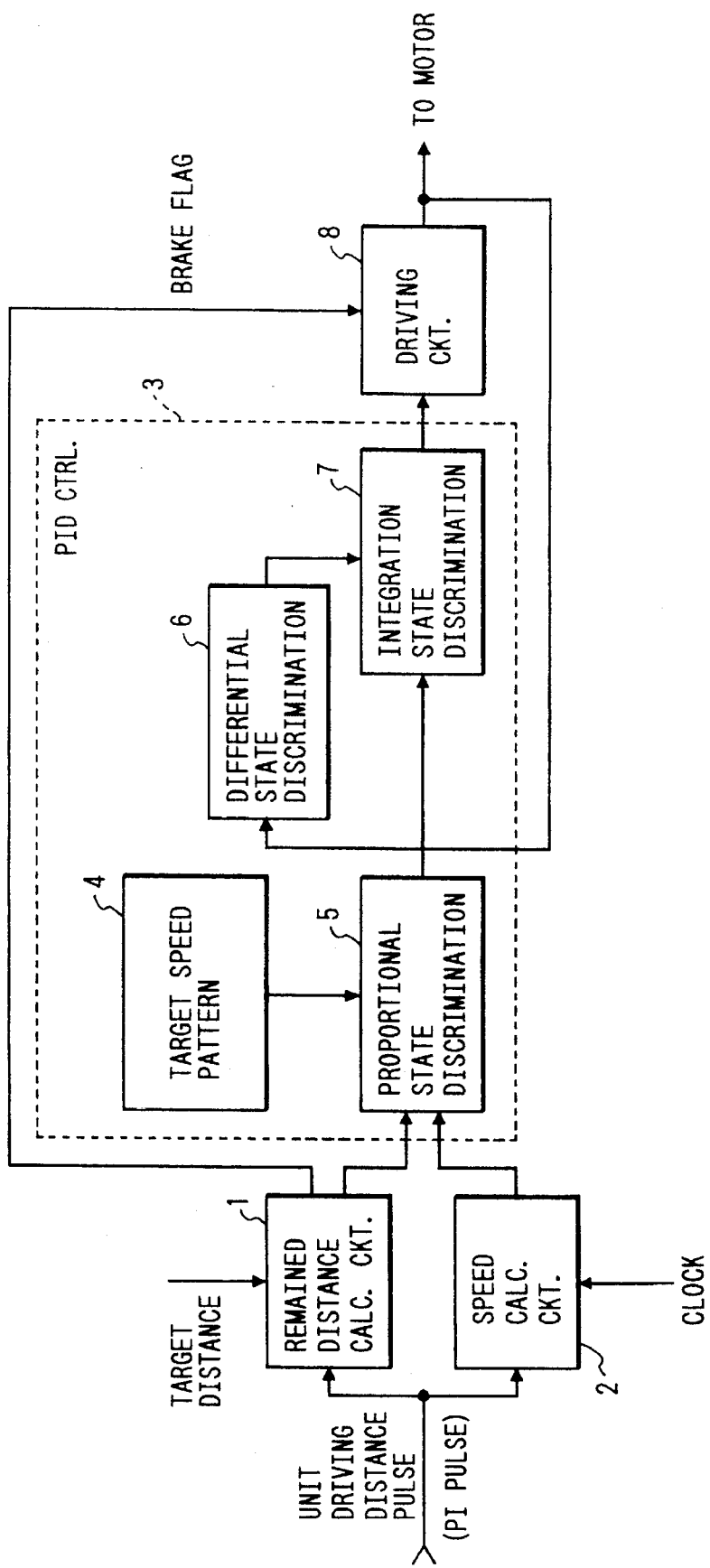
FIG. 2 is a block diagram showing a PID driving control system.
Figure 3:
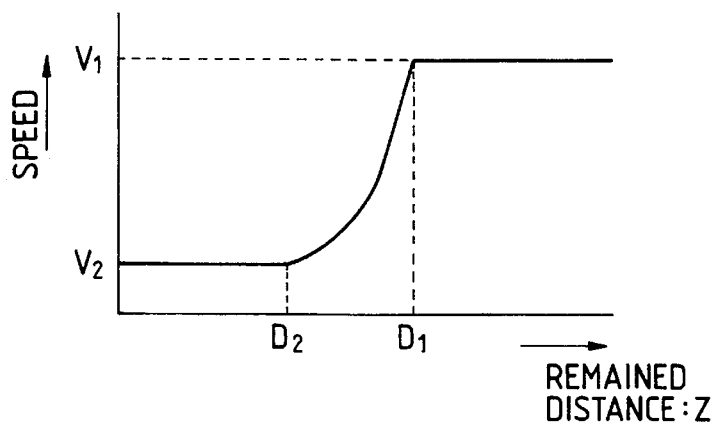
FIG. 3 is a diagram showing a target speed pattern.
Figure 4:
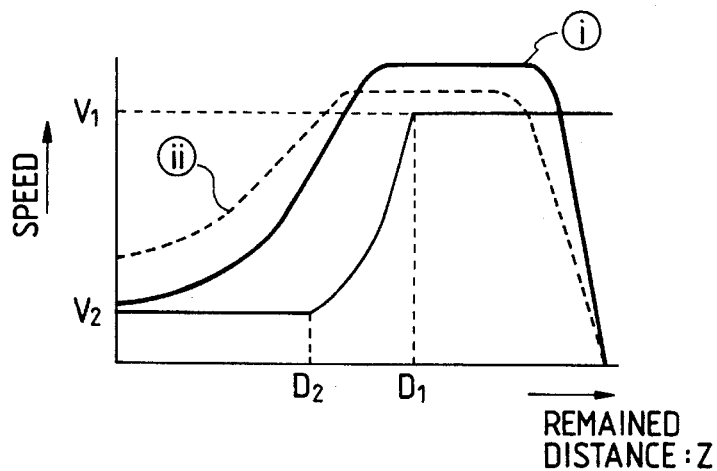
FIG. 4 is a diagram showing a driving speed pattern due to an inertia load fluctuation.
Figure 5:
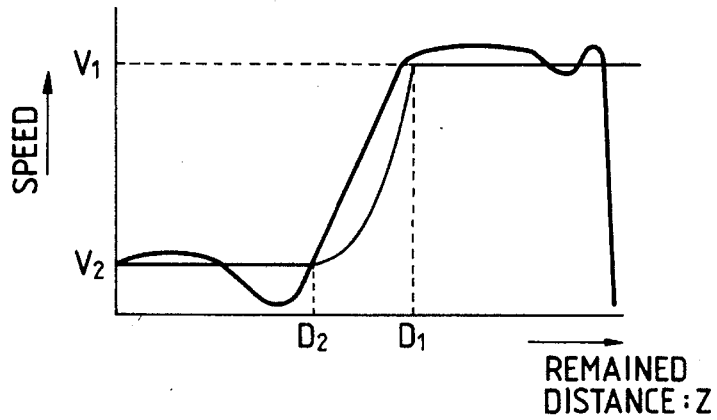
FIG. 5 is a diagram showing a driving speed pattern due to a PID driving control in which a proportional discrimination is enhanced.

FIG. 1 shows a fuzzy driving control system according to the first embodiment of the invention. In FIG. 1, the component elements which execute the same operations as those in the PID driving control system of FIG. 2 are designated by the same reference numerals. A fuzzy control section which differs from that in FIG. 2 will now be described with reference to FIG. 6. It is now assumed that the following production rules are used in the fuzzy driving control.

Rule 1: Remained distance=(large) THEN (+ΔE)

Rule 2: Speed=(high) THEN (−ΔE)

Figure 6:
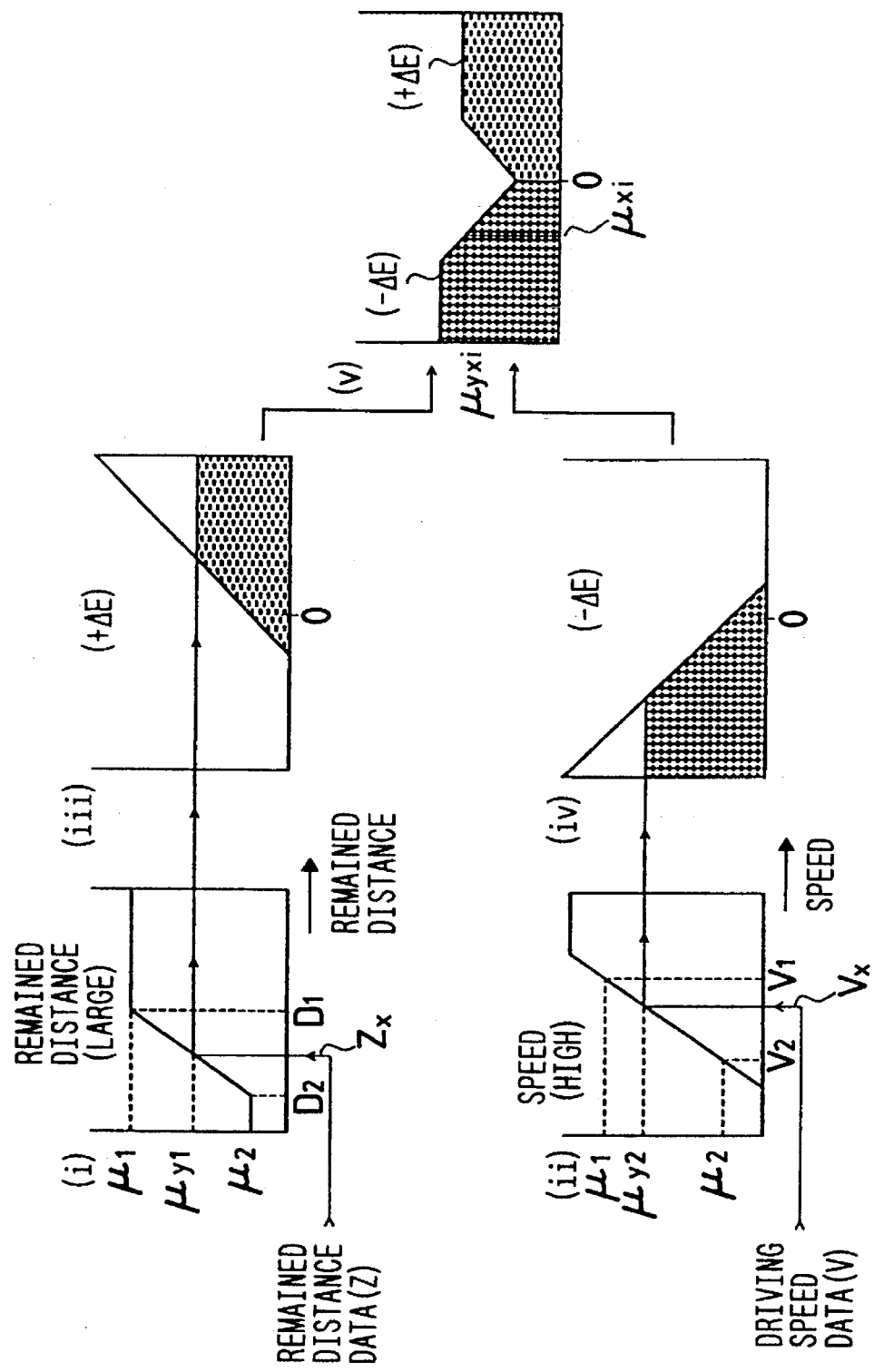
FIG. 6 is an operation explanatory diagram for explaining the operation of FIG. 1.
Figure 11:
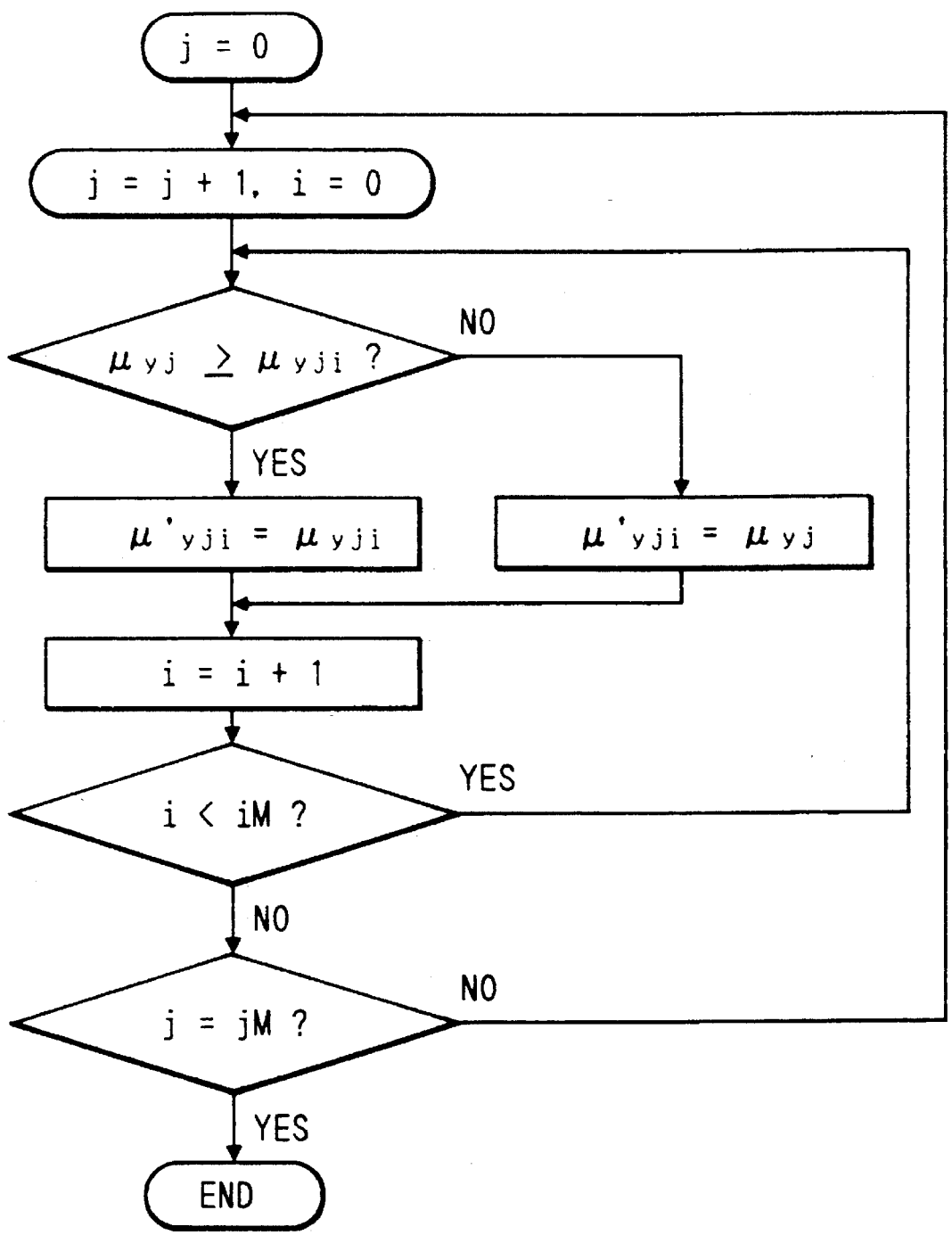
FIG. 11 is an explanatory diagram showing a flowchart for a THEN calculation.

A mark ( ) denotes a fuzzy set and ΔE indicates a driving information deviation amount. The remained distance data Z is supplied to a remained distance (large) MF 9 as a membership function to express a fuzzy set of the remained distance (large). On the other hand, driving speed data V is supplied to a speed (high) MF 10 as a membership function to express the fuzzy set of the speed (large). (i) and (ii) in FIG. 6 show examples of the remained distance (large) MF 9 and the speed (high) MF 10, respectively. Now, assuming that the remained distance data is equal to $Z_x$ and the speed data is equal to $V_x$, fuzzy values which are generated from the remained distance (large) MF 9 and the speed (high) MF 10 are set to $\mu_{y1}$ and $\mu_{y2}$, respectively. The two fuzzy values are supplied to THEN calculation circuits 13 and 14 (having the same construction) to express "THEN" of the rule. Membership function data are respectively supplied to the THEN calculation circuits 13 and 14 from a membership function (+ΔE) MF 11 ((iii) in FIG. 6) to express an amount to deviate the drive information in the plus direction and from a membership function (−ΔE) MF 12 ((iv) in FIG. 6) to express an amount to deviate the drive information in the minus direction. The THEN calculation is, for instance, an arithmetic operation for "head cutting" the remained distance and speed by the fuzzy values $\mu_{y1}$ and $\mu_{y2}$ as shown in hatched portions of (iii) and (iv) in FIG. 6, respectively. Such a calculation is executed in accordance with a flowchart shown in FIG. 11, wherein j: INPUT DATA NO.

$\mu_{y1}$: FUZZY VALUE OF REMAINED DISTANCE DATA $\mu_{y2}$: FUZZY VALUE OF SPEED DATA i: (+ΔE) (or (−ΔE)) CARDINAL VALUE NO. 0~iM IN LEFT→RIGHT $\mu_{yji}$: (+ΔE) (or (−ΔE)) FUZZY VALUE IN EACH CARDINAL VALUE NO. i $\mu'_{yji}$: FUZZY VALUE AFTER THEN CALCULATION AT EACH i, j i GOES TILL INFINITY.

Figure 12:
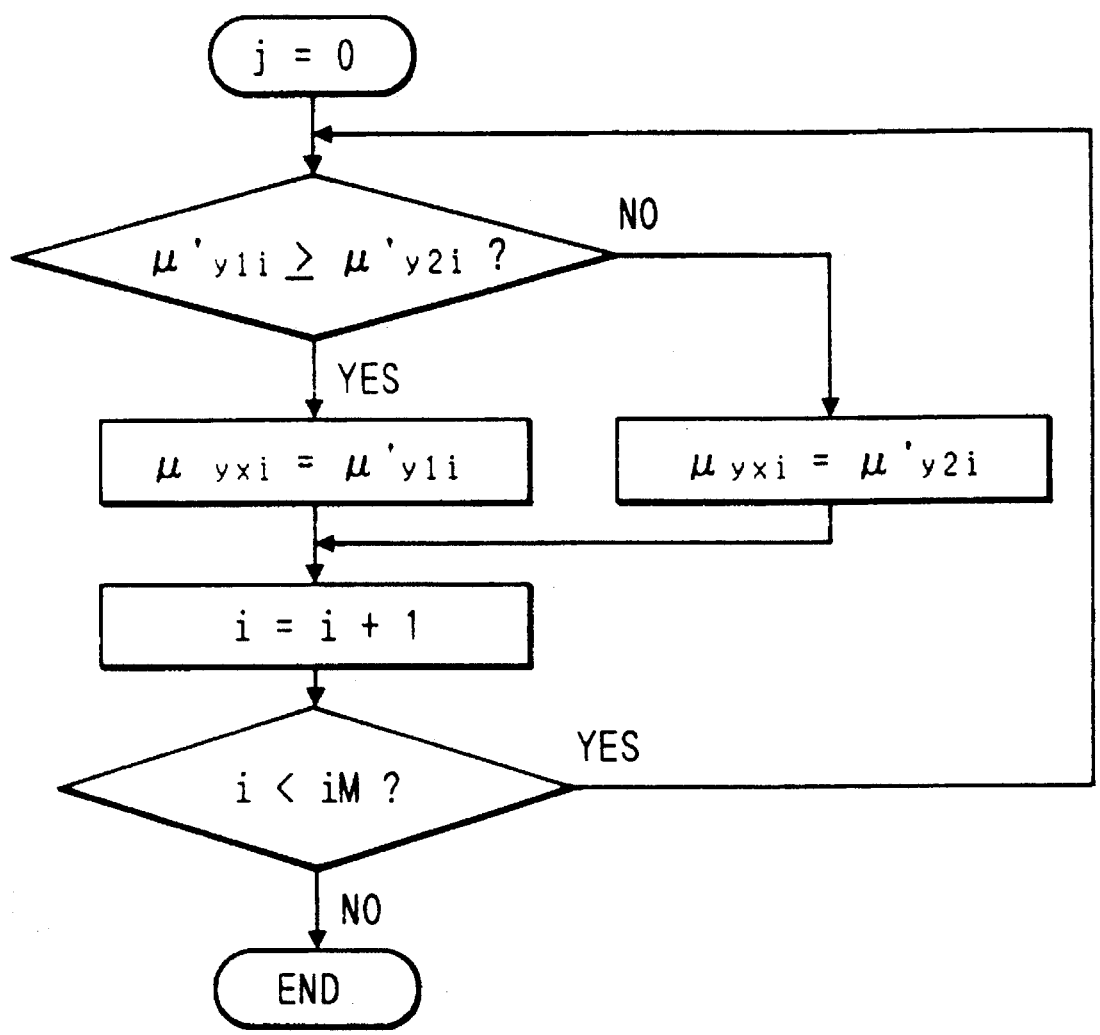
FIG. 12 is an explanatory diagram showing a flowchart for a rule combine calculation.

The two head-out membership functions are supplied to a rule combine circuit 15. (v) in FIG. 6 shows an output membership function from the rule combine circuit 15. It is now assumed that the rules 1 and 2 are interpreted as "or". Therefore, a calculation to preferentialy use larger one of the values of the two membership functions is executed. FIG. 12 shows a flowchart for such a calculation, wherein $\mu_{yxi}$: FUZZY VALUE AT CARDINAL VALUE $\mu_{xi}$ AFTER COMBINE CALCULATION.

The rule combined membership function is supplied to a de-fuzzy calculation circuit 16 and a calculation to obtain one representative value is executed. The de-fuzzy calculation is expressed by, for instance, a barycenter calculation shown by the following equation.

$$\Delta E = \frac{\sum_i \mu_{xi} \cdot \mu_{yxi}}{\sum_i \mu_{yxi}}$$

ΔE: numerical value indicative of the drive information deviation amount i: number of cardinal numerical values (the number of values of i can be set to an infinite value)

$\mu_{xi}$: cardinal value in i $\mu_{yxi}$: fuzzy value in i

The drive information deviation amount shown by ΔE is supplied to the driving circuit. In the fuzzy driving control, by setting symmetrical sets such as (+ΔE) and (−ΔE) as shown in (iii) and (iv) in FIG. 6 for the cardinal values, a stationary state is obtained only when the fuzzy values which are respectively generated from the remained distance (large) MF 9 and the speed (high) MF 10 are equal. In the conditions of FIG. 6, a control is performed so that ΔE is slightly deviated in the minus direction and the drive information value is reduced. Thus, the speed is reduced. That is, a speed pattern in the balance state can be unconditionally expressed by the membership functions of the remained distance (large) and the speed (high). Such a speed pattern can be regarded as a target speed pattern. When the cases of (i) and (ii) in FIG. 6 will now be described as examples, the target speed pattern is unconditionally determined as follows for the remained distance value $Z_x$.

When $Z_x \leq D_2$, $V_x = V_2$

When $D_2 < Z_x \leq D_1$, $$V_x = \frac{\left\{ \frac{(\mu_1 - \mu_2) \cdot Z_x}{(D_1 - D_2)} + \mu_1 - \frac{(\mu_1 - \mu_2) \cdot D_1}{(D_1 - D_2)} \right\} - \left\{ \mu_1 - \frac{(\mu_1 - \mu_2)V_1}{(V_1 - V_2)} \right\}}{\left\{ \frac{\mu_1 - \mu_2}{V_1 - V_2} \right\}}$$

When $Z_x > D_1$, $V_x = V_1$

When $Z_x = 1$ by controlling the speed V for the remained value $Z_x$, a brake flag is set in order to set the driving means into a braking mode and the driving circuit 8 is controlled, thereby setting the stop position to a position within a range of $0 < Z_x < 1$.

Figure 7:
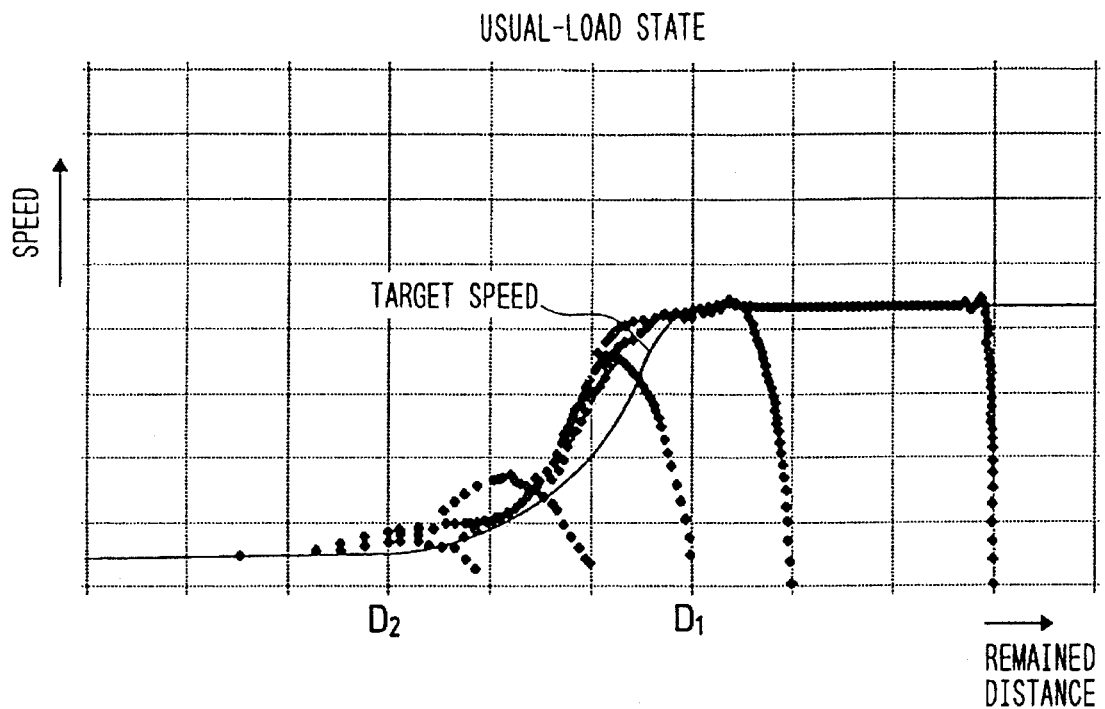
FIG. 7 is an explanatory diagram showing the results of experiments of the driving speed pattern of the fuzzy driving control in a usual load.
Figure 8:
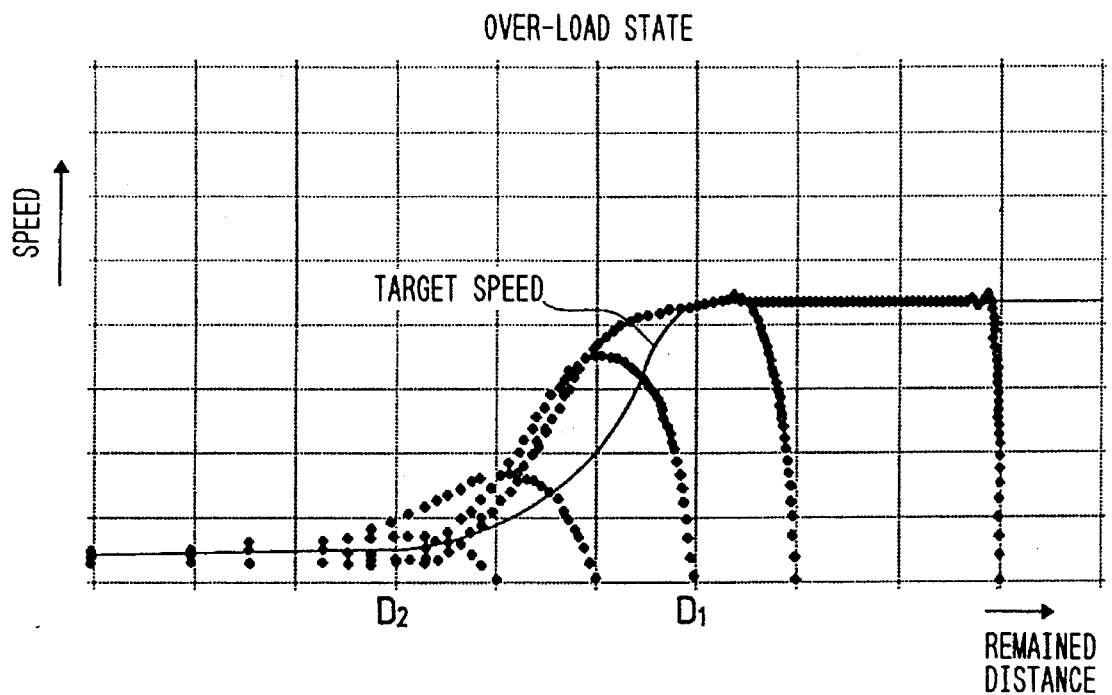
FIG. 8 is an explanatory diagram showing the results of experiments of the driving speed pattern of the fuzzy driving control in an over-load.

FIG. 7 shows a driving speed pattern under the usual load conditions when experiments of the driving control are executed in a certain driving system by using the fuzzy driving control algorithm described above. The shapes of the membership functions of the remained distance (large), speed (high), (+ΔE), and (−ΔE) are constructed in accordance with the above driving system and differ from those in FIG. 6. An axis of remained distance is based on the $\log_2$ scale. As will be understood from FIG. 7 in the high speed zone $(Z_x > D_1)$, the speed fairly accurately coincides with the target speed. Even in the decelerating zone $(D_2 < Z_x < D_1)$ and the low speed zone $(Z_x > D_2)$, coincidence degrees are high. As mentioned above, in spite of the strong control, fluctuation elements in the speed pattern such as overshot, ringing, ripple, and the like are small. FIG. 8 shows a driving speed pattern when an inertia load which is large in the driving pattern is applied to the driving system. In such a state as well, a coincidence degree to the target speed in the high speed zone is still fairly high. Even in the decelerating zone and the low speed zone, the speeds can be adequately used although the deviations from the target speed are slightly increased.

Figure 9:
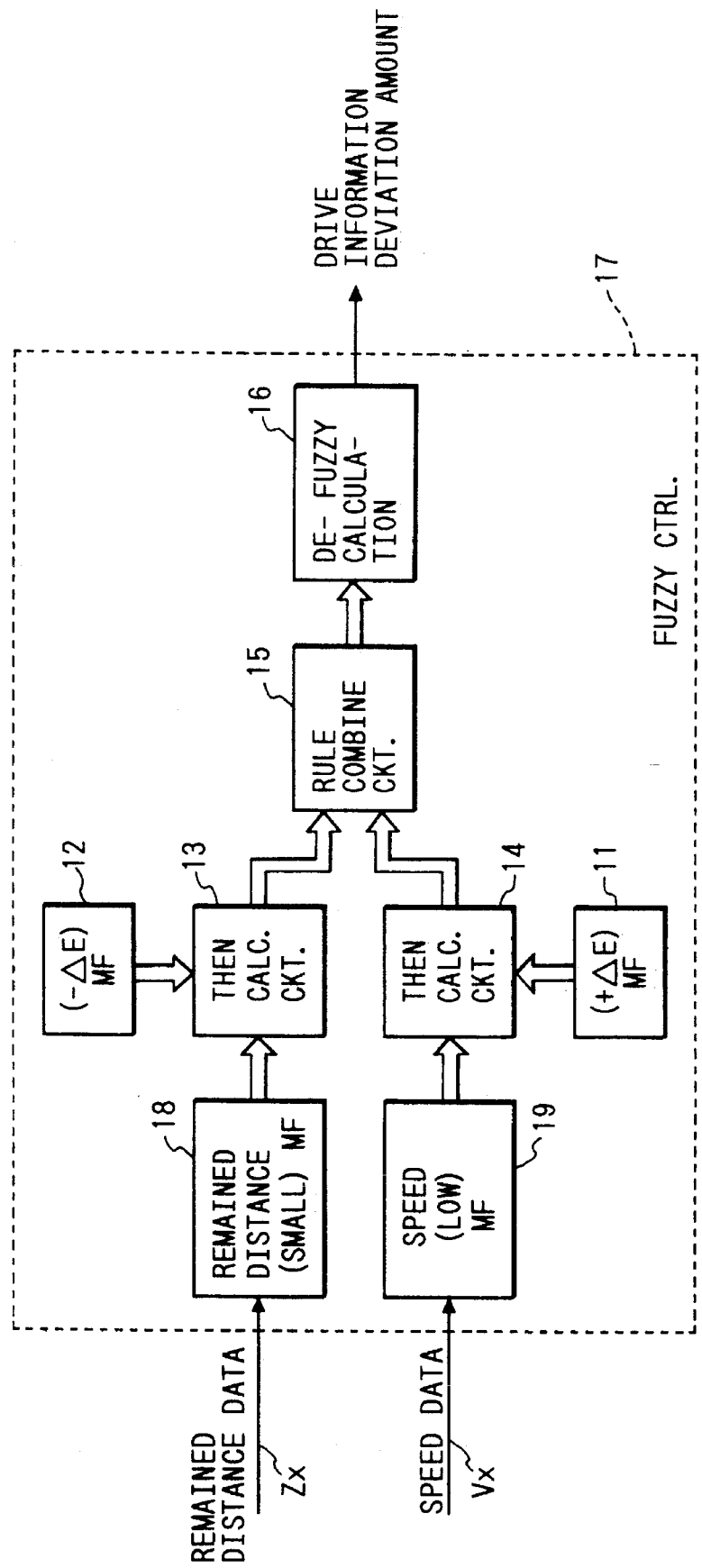
FIG. 9 is a block diagram showing a fuzzy driving control system according to the second embodiment of the invention.

FIG. 9 shows the second embodiment in the fuzzy driving control. The component elements which perform the same operations as those in FIG. 1 are designated by the same reference numerals. In this case, the following production rules are used.

Rule 1: IF remained distance (small) THEN (−ΔE)

Rule 2: IF speed (low) THEN (+ΔE)

Figure 10:
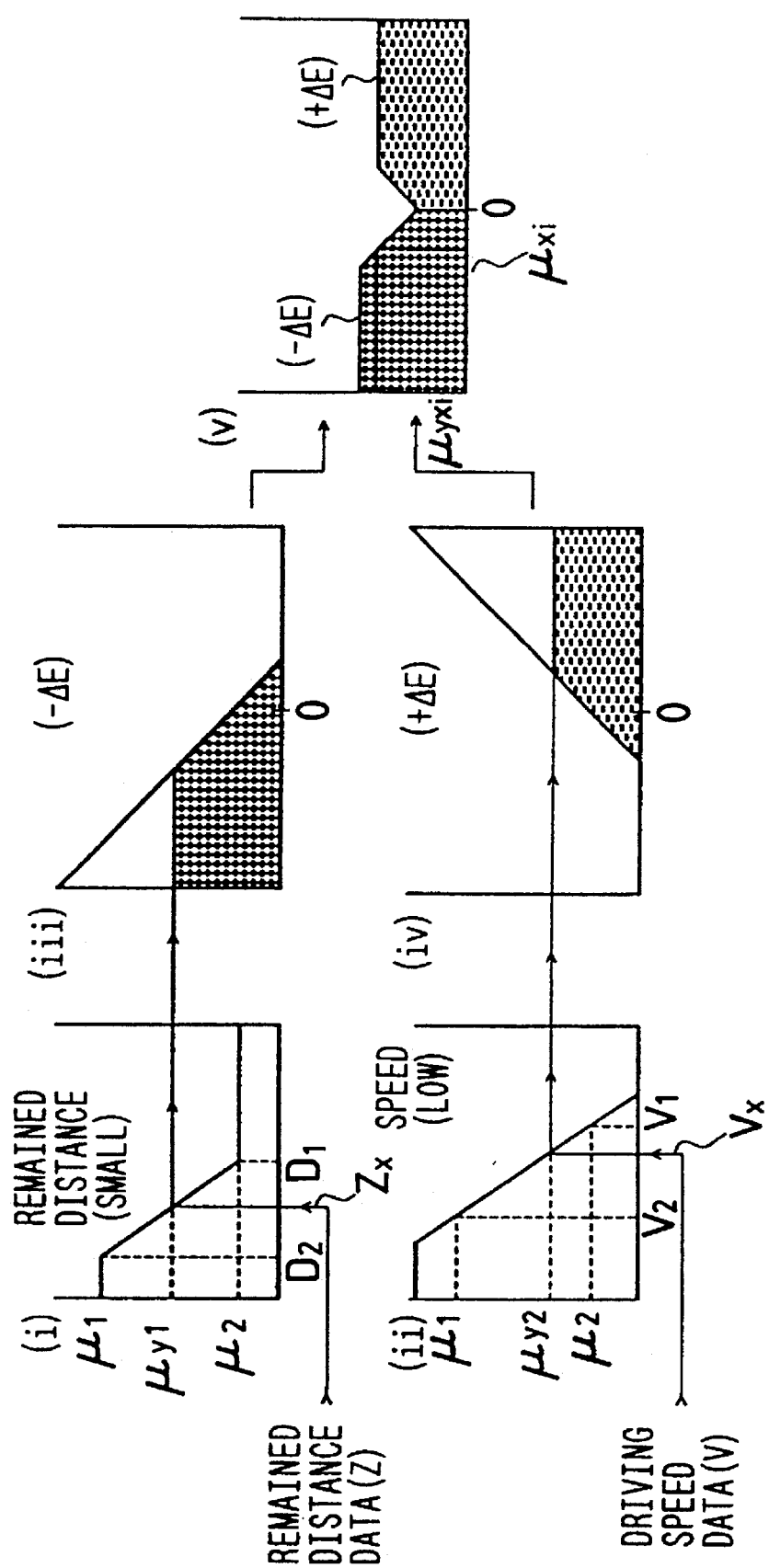
FIG. 10 is an operation explanatory diagram for explaining the operation of FIG. 9.

In these rules defined as "IF A THEN B", A relates to front rules, or anticipation rules, and B relates to rear rules, or conclusion rules. FIG. 10 is a diagram for explaining the operation. In a manner similar to the first embodiment, a stationary state is obtained only when the output fuzzy values $\mu_{y1}$ and $\mu_{y2}$ of the membership functions of a remained distance (small) MF 18 and a speed (low) MF 19 are equal. Consequently, the target speed pattern is unconditionally determined as follows for the remained distance value $Z_x$.

When $Z_x \leq D_2$, $V_x = V_2$

When $D_2 < Z_x \leq D_1$, $$V_x = \frac{\left\{ \frac{(\mu_2 - \mu_1) \cdot Z_x}{(D_1 - D_2)} + \mu_2 - \frac{(\mu_2 - \mu_1) \cdot D_1}{(D_1 - D_2)} \right\} - \left\{ \mu_2 - \frac{(\mu_2 - \mu_1)V_1}{(V_1 - V_2)} \right\}}{\left\{ \frac{\mu_2 - \mu_1}{V_1 - V_2} \right\}}$$

When $Z_x > D_1$, $V_x = V_1$

The operation is similar to that in the first embodiment.

As described above, according to the fuzzy driving controls of the first and second embodiments in each of which the fuzzy control by the foregoing inference rules is applied to the driving control, there are the following effects.

a. In the fuzzy driving control in which the state discrimination for the driving object is strong (fine), a coincidence degree for the target speed pattern is extremely better than that in the case of the PID driving control. The target speed pattern can be easily designed.

b. Although the fuzzy driving control is a strong control, it becomes difficult to cause the ringing and ripple in the speed pattern.

c. As compared with the PID control, a wide control range can be easily obtained for environmental changes (fluctuations of temperature, humidity, power source voltage, etc.) and fluctuations of driving conditions.

d. Although the fuzzy driving control also responds to a small driving condition fluctuation such as a disturbance (variation in driving load, etc.) or the like, in the case of the PID control, in order to make the control to respond to such a small fluctuation, a ringing and a ripple certainly occur in the speed pattern.

e. Since the target speed pattern is expressed by the membership functions of the remained distance (large) (or remained distance (small)) and the speed (high) (or speed (low)), there is no need to particularly provide target speed pattern data.

The third embodiment will now be described.

A fuzzy driving control system as a prerequisite of the third embodiment will be first described with reference to FIG. 14.

Figure 14:
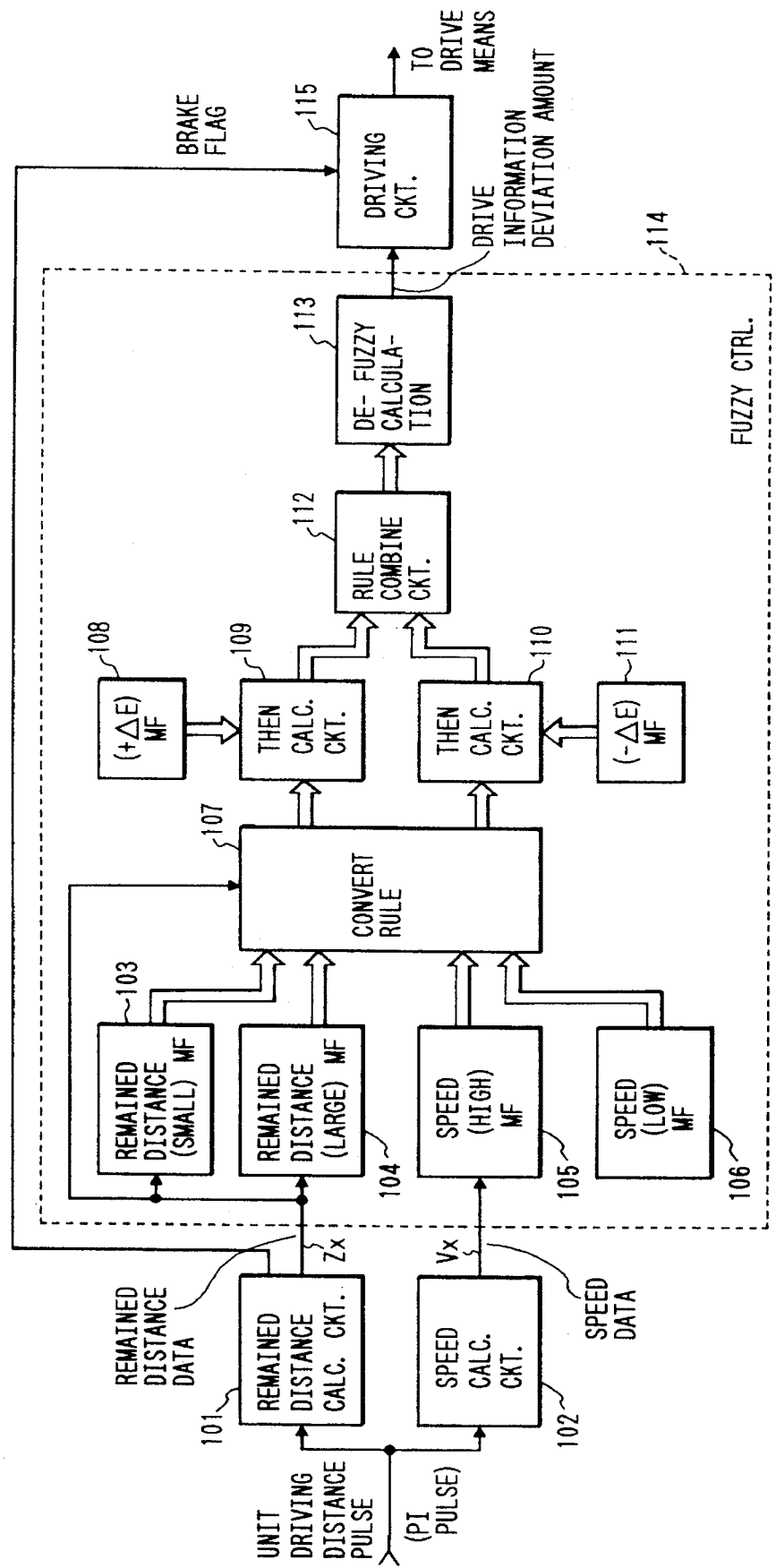
FIG. 14 is a block diagram showing another example of the fuzzy driving control apparatus.

In the system of FIG. 14, a unit driving distance pulse (hereinafter, referred to as a PI pulse) which is generated every predetermined driving distance $\Delta D$ in a driving object and a target distance DS in which a target driving distance is shown by the number of a $\Delta D$ are used as control factors and a control is executed. As driving state information which is used in the system, the following two data are used: remained distance data $Z_x$ which is generated from a remained distance calculation circuit 101 to subtract "1" from the value of DS every generation of one PI pulse and reciprocal data $1/V_x$ of the speed which is generated from a speed calculation circuit 102 to count a generating time interval between the PI pulses by clocks.

In the fuzzy driving control apparatus according to the embodiment, the following production rules are used.

In the case of remained distance value {large},

Rule 1: IF remained distance (large) THEN (–$\Delta E$)

Rule 2: IF speed (high) THEN (–$\Delta E$)

In the case of remained distance value {small},

Rule 1: IF remained distance (small) THEN (+$\Delta E$)

Rule 2: IF speed (low) THEN (+$\Delta E$)

Figure 15:
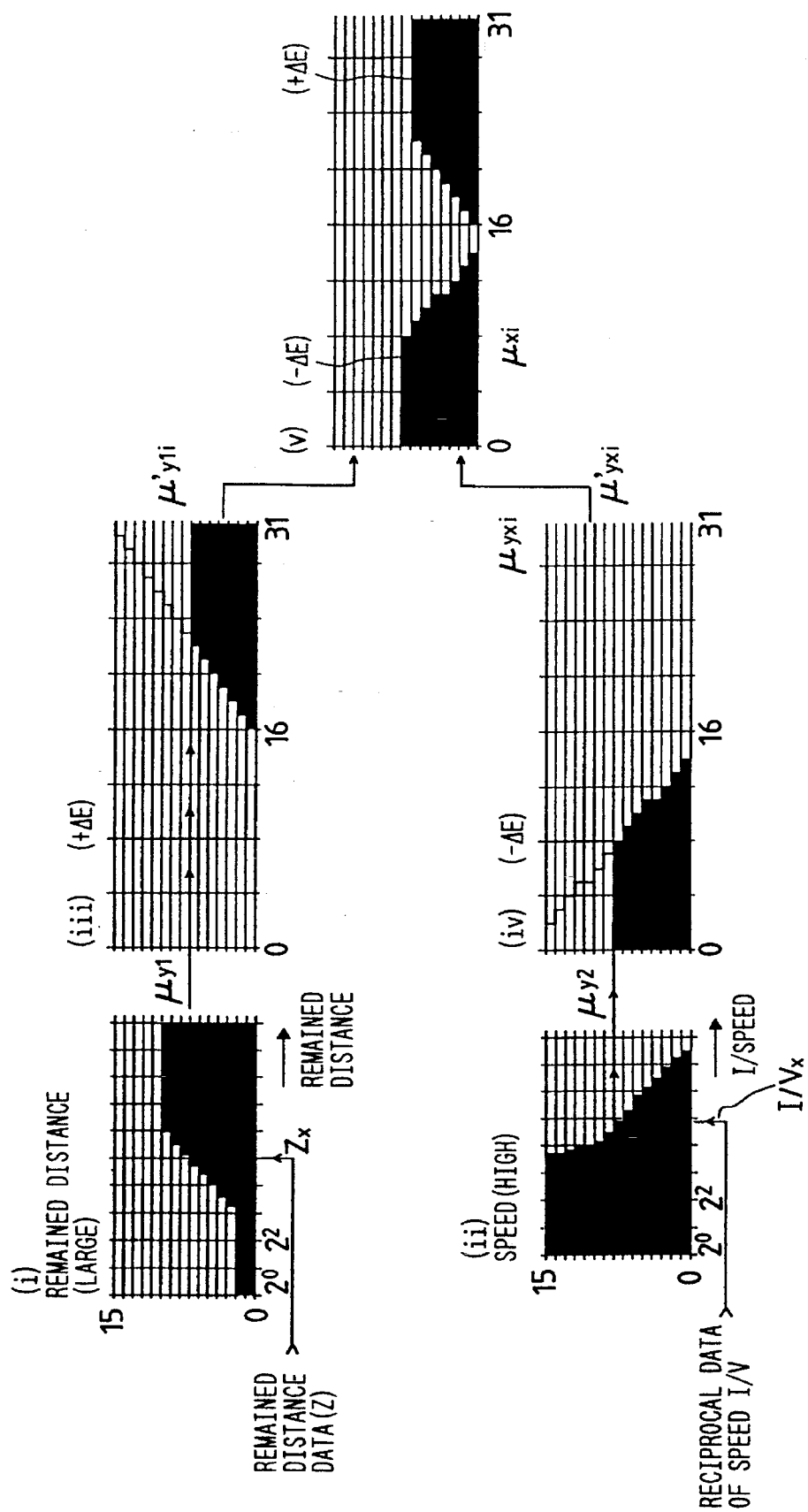
FIG. 15 is the first explanatory diagram for explaining the operation of FIG. 14.
Figure 16:
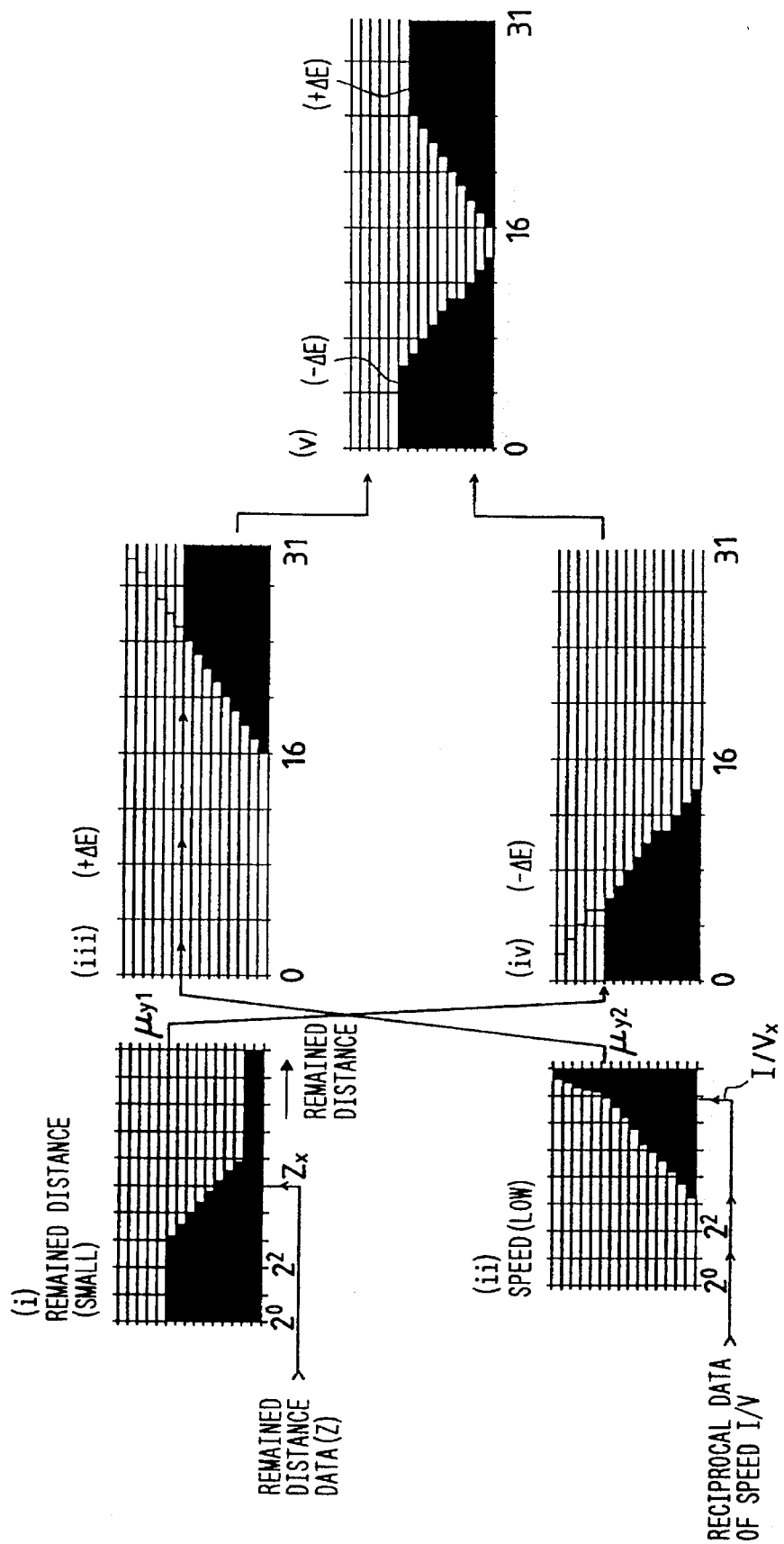
FIG. 16 is the second explanatory diagram for explaining the operation of FIG. 14.

A mark ( ) denotes a fuzzy set and a mark { } indicates a crisp set. $\Delta E$ denotes a drive information deviation amount. The remained distance data $Z_x$ is supplied to a remained distance (large) MF 104 as a membership function to express a fuzzy set of the remained distance (large). On the other hand, the driving speed data $V_x$ is supplied to a speed (high) MF 105 as a membership function to express a fuzzy set of the speed (high). FIG. 15 is a diagram for explaining the operation of the fuzzy control in the case of the remained distance value {large} (in this case, it is assumed that $Z_x > 32$). FIG. 16 is a diagram for explaining the operation of the fuzzy control in the case of the remained distance value {small} (in this case, it is assumed that $Z_x \leq 32$). In the case of the above example, the fuzzy value is set to the number 16 of discrete values of 0 to 15 and the remained distance data $Z_x$ and the reciprocal $1/V_x$ of the speed data are expressed on the basis of the $\log_2$ scale. The number of discrete values is set to 8/OCT. The reason why such a number is selected is to intend to reduce a memory amount for expressing the fuzzy set and to consider the realization of a practical use of the apparatus.

Figure 17:
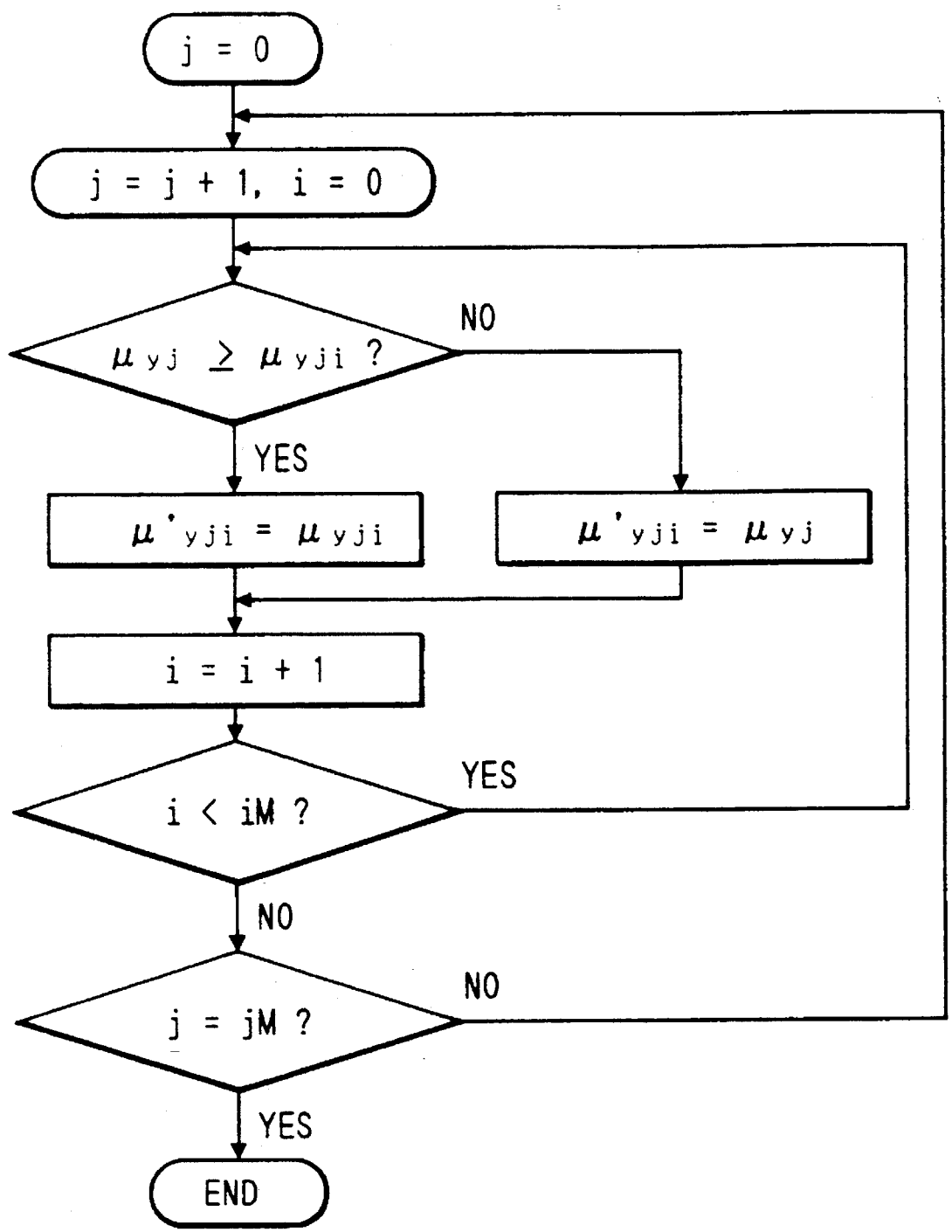
FIG. 17 is an explanatory diagram showing a flowchart for a THEN calculating section.

Now, assuming that the remained distance data is equal to $Z_x$ and the speed data is equal to $V_x$, the fuzzy values which are generated from the remained distance (large) MF 104 (remained distance (small) MF 103) and the speed (high) MF 105 (speed (low) MF 106) are equal to $\mu y_1$ and $\mu y_2$, respectively. The two fuzzy values are supplied to THEN calculation circuits 109 and 110 (having the same construction) to express "THEN" of the rule. Membership function data are respectively supplied to the THEN calculation circuits 109 and 110 from a membership function (+$\Delta E$) MF 108 ((iii) in FIG. 15 or (iii) in FIG. 16) to express an amount to deviate the drive information in the plus direction and a membership function (–$\Delta E$) MF 111 ((iv) in FIG. 15 or (iv) in FIG. 16) to express an amount to deviate the drive information in the minus direction. As shown in FIGS. 15 and 16, a rule converting section 107 to convert the rule in accordance with the remained distance value $Z_x$ is provided. The THEN calculations are "head cutting" arithmetic operations by the fuzzy values $\mu y_1$ and $\mu y_2$ by the remained distance and the speed as shown in, for example, hatched portions in (iii) and (iv) and FIG. 15 ((iii) and (iv) in FIG. 16). Such calculations are executed in accordance with a flowchart shown in FIG. 17, wherein j: INPUT DATA NO.

$\mu_{y1}$: FUZZY VALUE OF REMAINED DISTANCE DATA $\mu_{y2}$: FUZZY VALUE OF SPEED DATA i: (+$\Delta E$) (or (–$\Delta E$)) CARDINAL VALUE NO. 0–iM IN LEFT→RIGHT $\mu_{yji}$: (+$\Delta E$) (or (–$\Delta E$)) FUZZY VALUE IN EACH CARDINAL VALUE NO. i $\mu'_{yji}$: FUZZY VALUE AFTER THEN CALCULATION AT EACH i, j i GOES TILL INFINITY.

In the case of the above example, in order to reduce the scale of calculations, the cardinal number of the membership function to express (+$\Delta E$) or (–$\Delta E$) is set to 32 which is equal to the number of discrete values of 0 to 31. The two head-cut membership functions are supplied to a rule combining section 112. (v) in FIG. 15 ((v) in FIG. 16) shows an output membership function from the rule combining section 112. The relation between the rules 1 and 2 is now interpreted as "or". Therefore, the rule combining section executes a calculation such as to preferentially use larger one of the two fuzzy values of the two membership functions for each of the cardinal values.

Figure 18:
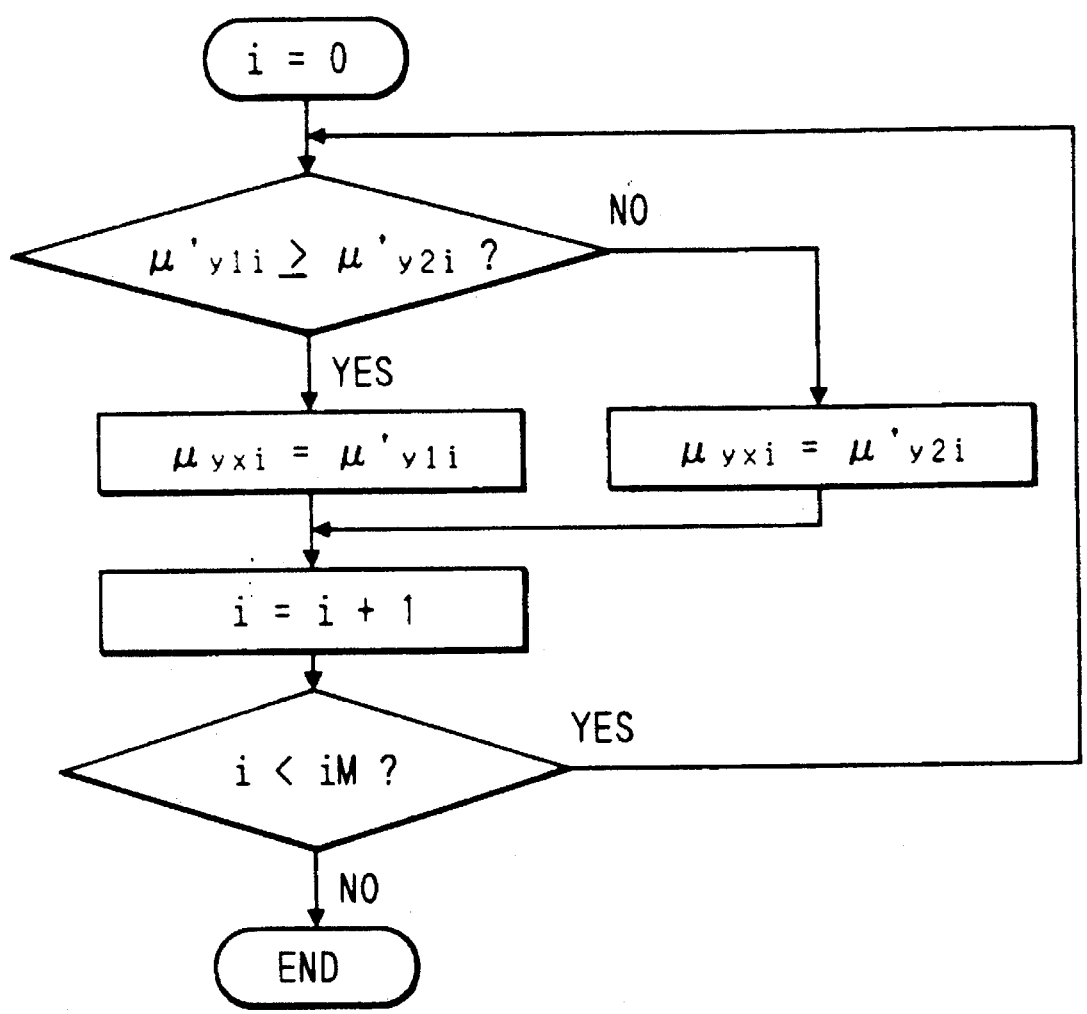
FIG. 18 is an explanatory diagram showing a flowchart for a rule combining section.

FIG. 18 shows a flowchart for the above combining operation, wherein $\mu_{yxi}$: FUZZY VALUE AT CARDINAL VALUE $\mu_{xi}$ AFTER COMBINED CALCULATION.

The rule combined membership function is supplied to a de-fuzzy calculation circuit 113 and a calculation to obtain one representative value is performed. The de-fuzzy calculation is expressed by a barycenter calculation as shown in, for instance, the following equation.

$$\Delta E = \left( \frac{\sum_i \mu_{xi} \cdot \mu_{yxi}}{\sum_i \mu_{yxi}} - 15.5 \right) /N \ldots 1)$$

ΔE: numerical value indicative of the drive information deviation amount

N: constant i: number of cardinal numerical values $\mu_{xi}$: cardinal value in i $\mu_{yxi}$: fuzzy value in i The drive information deviation amount shown by ΔE is supplied to a driving circuit 115. In the fuzzy driving control apparatus, by setting symmetrical sets such as (+ΔE) and (−ΔE) as shown in (iii) and (iv) in FIG. 15 ((iii) and (iv) in FIG. 16) for the cardinal values, a stationary state is obtained only when the fuzzy values which are respectively generated from the remained distance (large) MF 104 (remained distance (small) MF 103) and the speed (high) MF 105 (speed (low) MF 106) are equal. In the conditions of FIGS. 15 and 16, a control is executed so that ΔE is slightly deviated in the minus direction and the drive information is reduced. Consequently, the speed is reduced.

That is, a speed pattern in the balanced state can be unconditionally expressed by the membership functions of the remained distance (large) (remained distance (small)) and the speed (high) (speed (low)). Such a speed pattern can be regarded as a target speed pattern. The reason why the rules are changed in accordance with the remained distance value $Z_1$ is to finely control in a constant speed zone since the fuzzy values are lowered in the case where there are sets of speed (high) and remained distance (large). The reason why the fuzzy value is lowered in the remained distance (large) and the fine control cannot be performed in the low speed zone is because the control is influenced by a discrete state of the fuzzy values.

Therefore, in FIG. 14, the controls in FIGS. 15 and 16 are switched on the basis of the remained distance $Z_x$ due to the operation of the rule converting section 107 as mentioned above, thereby enabling a fine control to be performed in the whole region. That is, when the remained distance value $Z_x$ is large, the MF 104 is connected to the THEN calculation circuit 109 and the MF 105 is connected to the THEN calculation circuit 110, thereby executing the control in FIG. 15. When the remained distance $Z_x$ is small, the MF 103 is connected to the THEN calculation circuit 110 and the MF 106 is connected to the THEN calculation circuit 109, thereby executing the control of FIG. 16. In this manner, the fine control is executed in the whole region.

When the remained distance value $Z_x$ is equal to "1", the brake flag is set and the driving means is set into the braking mode. For this purpose, the driving circuit 115 sets the stop distance into a range of $0 < Z_x < 1$ in correspondence to it. In the driving means such as a motor or the like, generally, in order to simplify the driving circuit and to reduce the power loss, the PWM (pulse width modulation) driving is mainly executed for such a driving control. In this instance, a driving energy is set by the average value which is determined by the pulse width/pulse period. When the pulse period is constant, the driving energy is proportional to the pulse width. In this case, the drive information deviation amount ΔE is equal to the pulse width deviation amount. The pulse width is generally set to a discrete value.

However, when the driving pulse width as drive information is discrete, the values other than the discrete value cannot be supplied to the driving means. Therefore, the values other than the discrete value in the driving pulse width deviation amount ΔE are, for instance, omitted and calculated in the driving circuit 115.

Figure 19A:
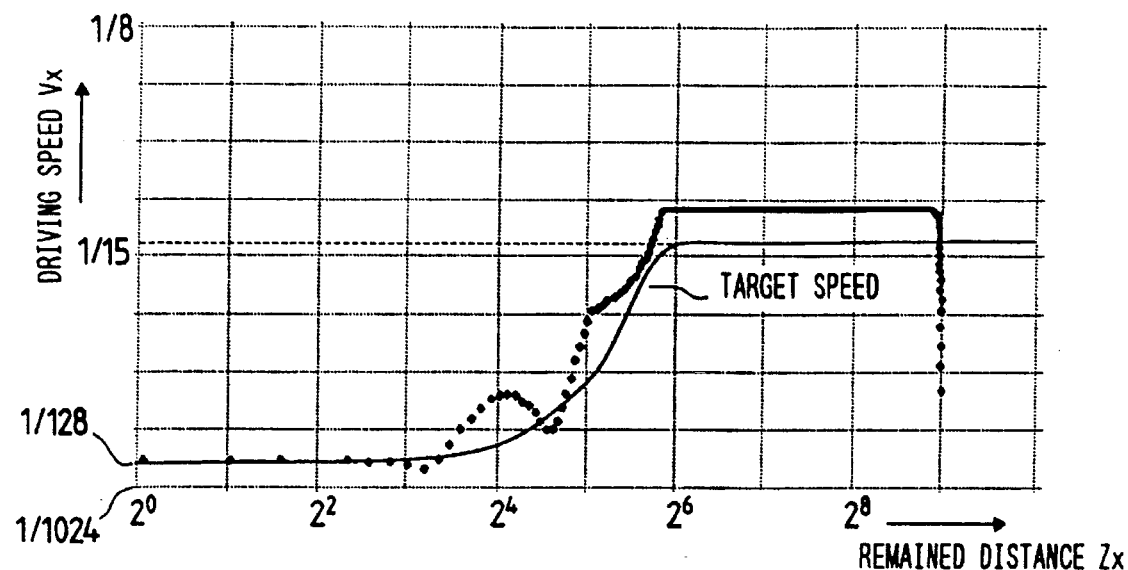
FIG. 19 is an explanatory diagram showing a driving speed pattern and a driving pulse interval locus according to the apparatus of FIG. 14.
Figure 19B:
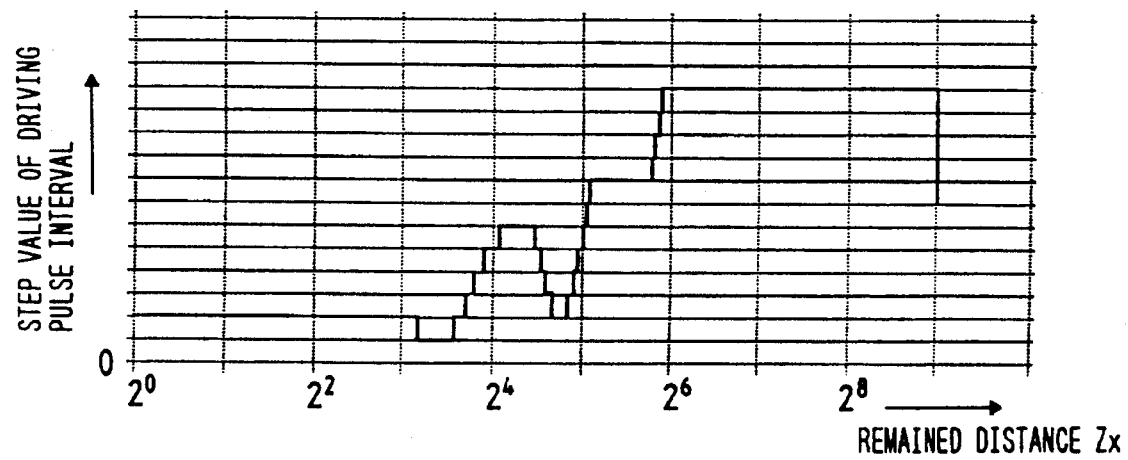

FIG. 19 shows a driving speed pattern and driving pulse interval step values when the driving control is performed by the construction of FIG. 14 by using PWM driving means in which the pulse width has only the discrete values of 16 stages for a certain driving object. As will be obviously understood from the diagram, a coincidence degree to a target speed in the high speed zone ($Z_x > 2^6$) is not so good and a large speed ripple occurs in the decelerating zone ($2^3 < Z_x \leq 2^6$). The driving pulse width in the high speed zone ($Z_x > 2^6$) is constant and this means that the driving control is not accurately performed.

The construction of FIG. 14 has a problem such that it takes a long calculating time because the THEN calculation, rule combining calculation, and de-fuzzy calculating process are executed.

Figure 13:
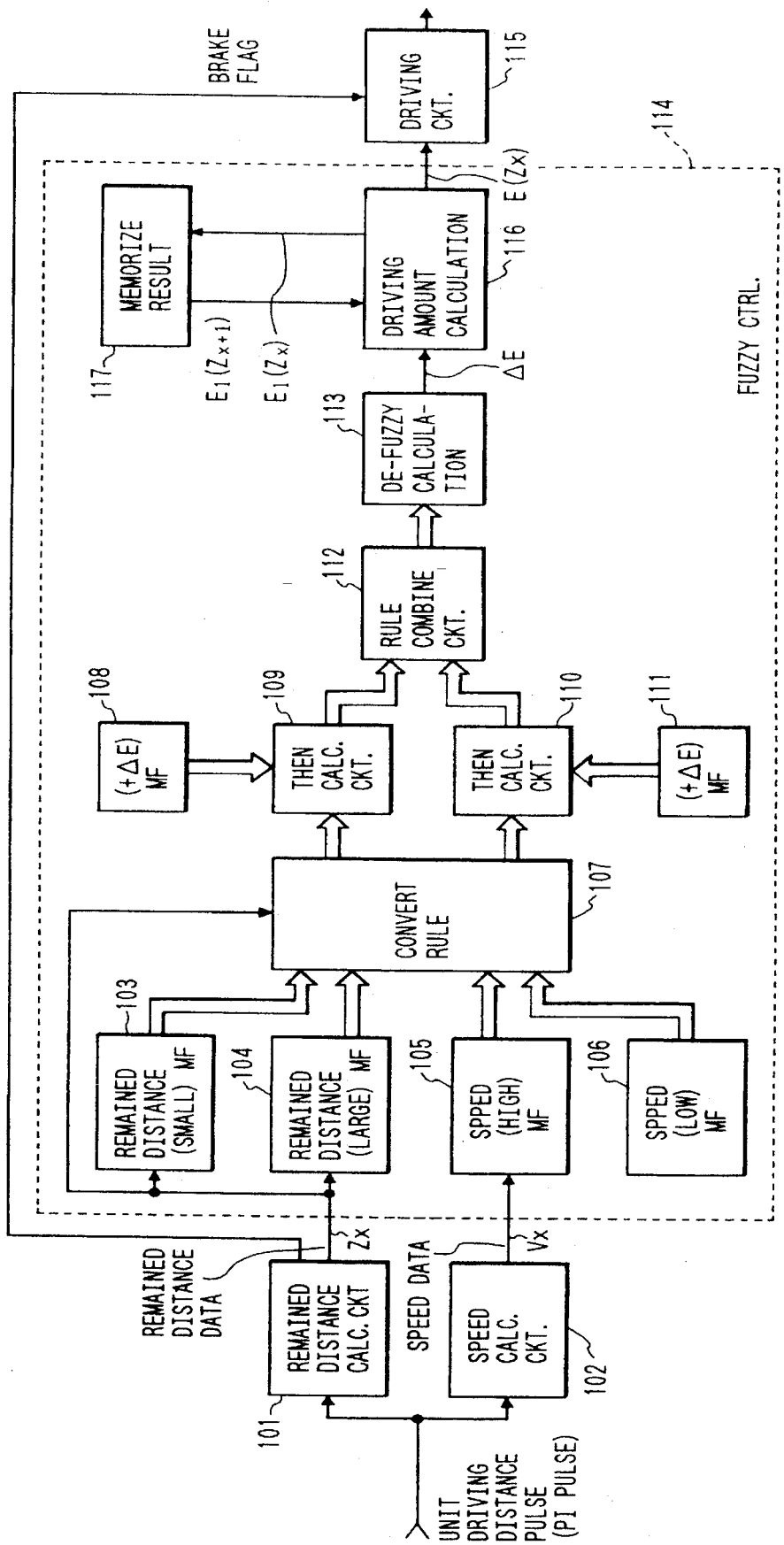
FIG. 13 is a block diagram showing the third embodiment of a fuzzy driving control apparatus embodying the invention.

FIG. 13 shows the third embodiment of a fuzzy driving control apparatus embodying the invention. In FIG. 13, it is assumed that the pulse width is controlled at discrete value intervals of every integer. FIG. 13 differs from FIG. 14 with respect to a point that a driving amount calculating section 116 and a result memory section 117 are provided at an output stage of the de-fuzzy calculating section 113. The driving amount calculation contents in the driving amount calculating section 116 are as follows.

$$\left\{ \begin{array}{rcl} E_1(Z_x) & = & E_1(Z_x+1) + \Delta E \\ & = & E_1(Z_x+1) + (CG(Z_x) - 15.5)/N \\ E(Z_x) & = & \text{value of } (E_1(Z_x)) \text{ from which the} \\ & & \text{figures below the decimal point} \\ & & \text{are omitted} \end{array} \right\} \quad 2)$$

$$CG(Z_x) = \sum_i \mu_{xi} \cdot \mu_{yxi} / \sum_i \mu_{yxi}$$

$E_1(Z_x)$ indicates the result of the calculation of the detailed driving amount in the remained distance value $Z_x$ and $CG(Z_x)-15.5/N$ is a value of the calculation result of the de-fuzzy calculating section 113. $E(Z_x)$ indicates the driving amount (for instance, driving pulse width) as a discrete value which is supplied to the driving circuit 115 and is used to actually control the driving means. $(CG(Z_x)-15.5)/N$ indicates the drive information deviation amount ΔE and N is a constant.

When $d_E$ assumes a driving amount error and is equal to $E_1(Z_x)-E(Z_x)$, the following equation 3) is satisfied until $$\left| \sum_{Z_x} dE \right|$$

exceeds the discrete value interval "1".

Figure 20A:
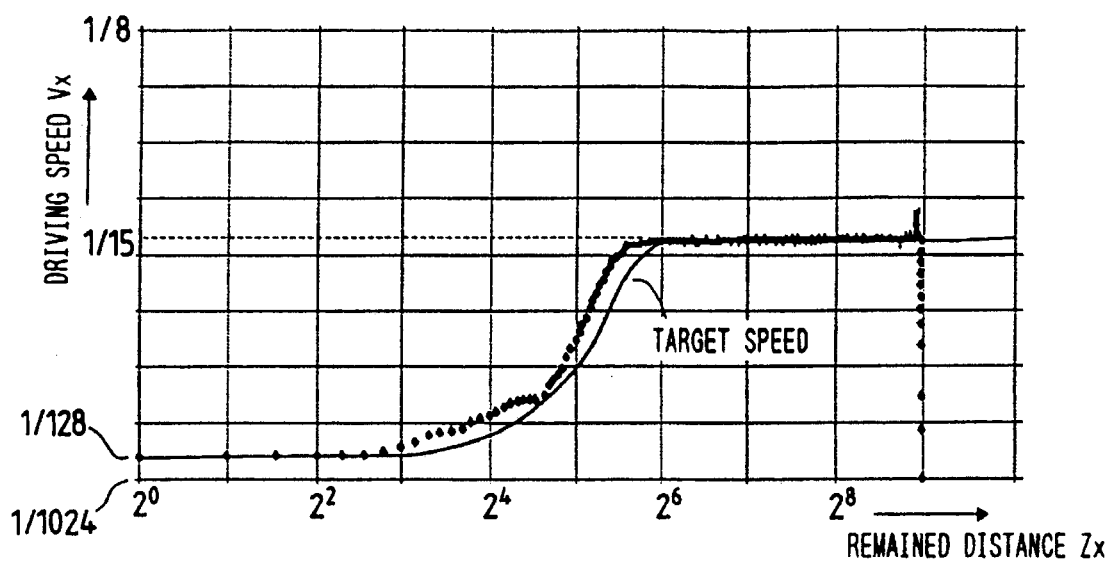
FIG. 20 is an explanatory diagram showing a driving speed pattern and a driving pulse interval locus according to the apparatus of FIG. 13.
Figure 20B:
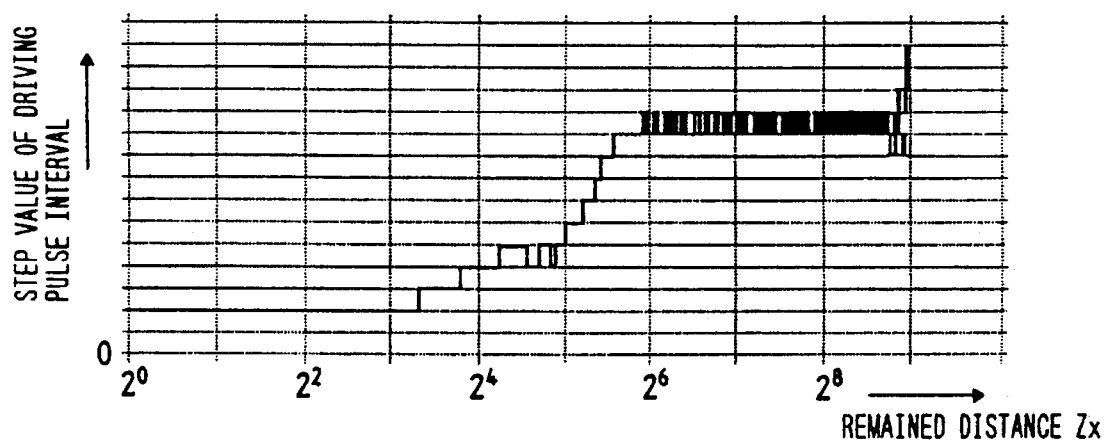

By integrating the driving amount error dE by $$E_1(Z_x) = E(Z_x+1) + \sum_{Z_x} dE + \Delta E \quad 3)$$

when $$\left| \sum_{Z_x} dE \right|$$

is equal to or larger than the discrete value interval "1", an actual driving amount $E(Z_x)$ is changed. As a change in $E(Z_x)$, for instance, an integer (1) is added to $E(Z_x)$ obtained by the equation 2) or the like and the pulse width is fed back by the discrete value interval corresponding to the total amount from which the figures below the decimal point are omitted is fed back. Consequently, a stationary speed which cannot be expressed by the discrete value of the driving amount cannot be expressed and a driving amount error can be promptly calculated even in the decelerating zone. Thus, the over-amount is reduced and a speed ripple decreases as a result. FIG. 20 shows a driving speed pattern and a driving pulse interval in the case where the driving experiments are executed by using the fuzzy driving control apparatus of FIG. 13 under the same conditions as those in the case of the apparatus of FIG. 14. When comparing FIG. 20 with FIG. 19, not only a coincidence degree to the target speed in the high speed zone ($Z_x > 2^6$) is clearly excellent but also the speed ripple in the decelerating speed zone ($2^3 < Z_x \leq 2^6$) decreases.

Figure 21:
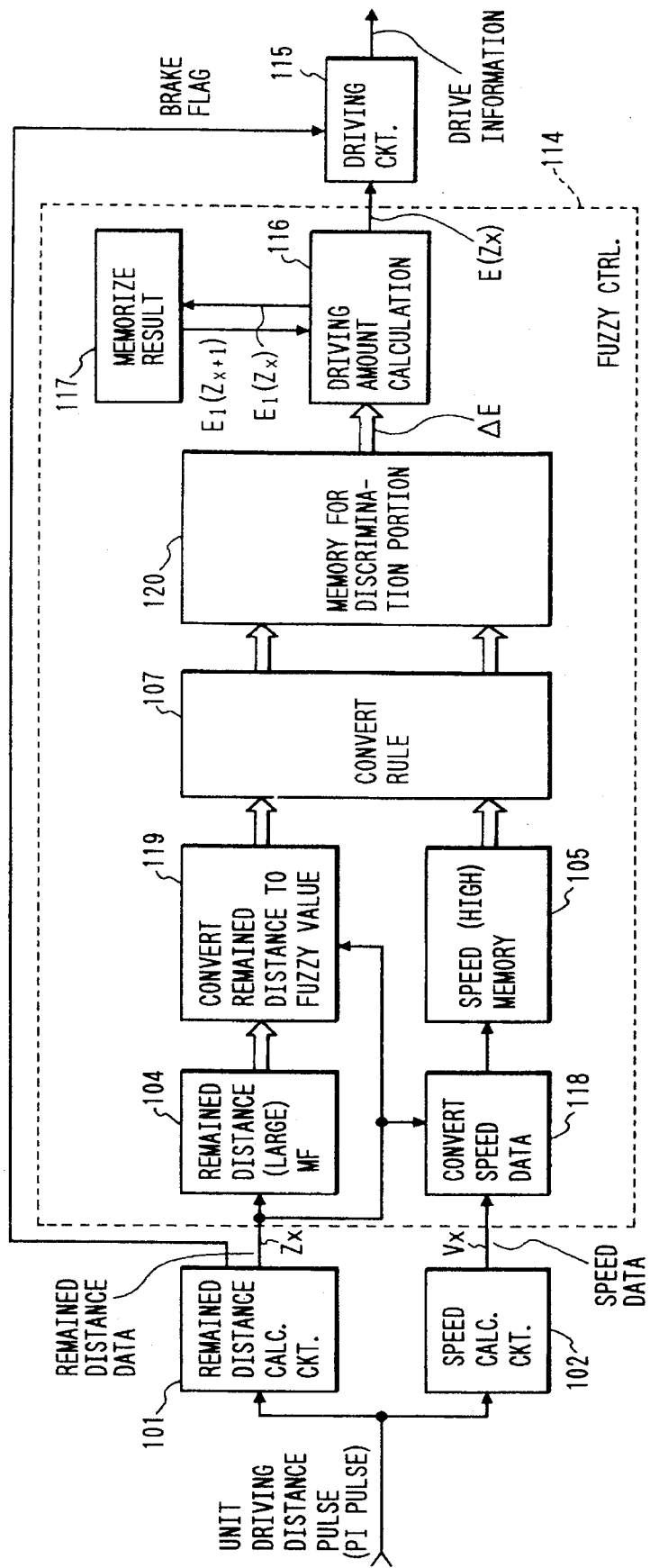
FIG. 21 is a block diagram showing the fourth embodiment of the invention.

FIG. 21 shows the fourth embodiment of a fuzzy driving control apparatus of the invention.

In FIG. 21, the component elements which perform the same operations as those in FIG. 13 are designated by the same reference numerals.

In the fourth embodiment, in the case of the remained distance value {large} (in this case $Z_x \geq 2^5$), a remained distance fuzzy value converting section 119 and a speed data converting section 118 directly pass the input values as they are and generate as output values, respectively. In the case of the remained distance value {small} (in this case, $Z_x < 2^5$), as will be understood from (i) in FIG. 15 and (i) in FIG. 16, the fuzzy sets of the remained distance (large) and remained distance (small) are symmetrical sets for the fuzzy value "12". Therefore, in the case of the remained distance value {small}, the remained distance fuzzy value converting section performs the following calculation for the fuzzy value of the remained distance (large), thereby obtaining the fuzzy value of the remained distance (small).

$$\mu_{y1} = 12 - \mu_{y1}$$

(where, "=" denotes the substitution)

As will be understood from (ii) in FIG. 15 and (ii) in FIG. 16, the fuzzy sets of the speed (high) and speed (low) are symmetrical sets for the cardinal value "11" of the $\log_2$ scale, so that the following calculation is executed in the speed data converting section 118.

$$\log_2(1/V_x) = 11 - \log_2(1/V_x)$$

(where, "=" denotes the substitution)

Therefore, by obtaining the fuzzy value from the speed (high) in accordance with $\log_2(1/V_x)$ derived by the above calculation, the fuzzy value of the membership function speed (low) is derived. By making the fuzzy sets symmetrical for a certain value of the fuzzy value or cardinal value as mentioned above, the fuzzy values of the remained distance (small) and speed (low) can be obtained by only the fuzzy sets of only the remained distance (large) and speed (high), so that a capacity of the memory to store the fuzzy sets can be reduced.

A discrimination portion memory 120 in FIG. 21 stores the results of the calculations of the THEN calculation circuits 109 and 110, (+ΔE) membership function generating section 108, (−ΔE) membership function generating section 111, rule combining section 112, and de-fuzzy calculation circuit 113 in FIG. 13. In this case, input values $\mu_{y1}$ (remained distance fuzzy value) and $\mu_{y2}$ (reciprocal fuzzy value of the speed) are supplied to the memory 120 and the drive information deviation amount ΔE is generated therefrom.

That is, the memory 120 stores the results of the calculations of the processes obtained by the above circuits in FIG. 13 and generates the output ΔE of the de-fuzzy calculation circuit 113 in FIG. 13 in accordance with the inputs $\mu_{y1}$ and $\mu_{y2}$.

The calculating processes which are executed in the above circuits and sections require a very long time in the construction of FIG. 13. However, in the embodiment of FIG. 21, such a time is equal to only the reading-out time from the memory. As a memory capacity, for instance, when it is now assumed that the maximum value of the drive information deviation amount ΔE is set to "3" (expressed by two bits) and six bits are prepared as data in which the discrete value interval is equal to or less than "1", the data length of ΔE is equal to eight bits.

A capacity of the memory 120 in this case is as follows since each of the fuzzy values is expressed by four bits. The value of the memory capacity is not concerned with the cardinal numbers of the (+ΔE) and (−ΔE) membership functions.

$$M_1 = (16 \times 16) \times 8 \text{ bits} = 256 \text{ bytes}$$

Memory capacities $M_2$ and $M_3$ of the remained distance (large) MF 104 and speed (high) MF 105 are as follows.

$$M_2 = (80 - 17) \times 4 \text{ bits} = 31.5 \text{ bytes}$$

$$M_3 = (64 - 17) \times 4 \text{ bits} = 23.5 \text{ bytes}$$

A total memory capacity M in the embodiment of FIG. 21 is as follows.

$$M = M_1 + M_2 + M_3 = 311 \text{ bytes}$$

However, when the whole fuzzy control section is constructed by a memory in accordance with the above specifications, the total memory capacity M becomes as follows.

$$\begin{aligned} M &= (80 - 17) \times (64 - 17) \times 8 \text{ bits} \times 2 \\ &= 5922 \text{ bytes} \end{aligned}$$

Consequently, the construction of FIG. 21 remarkably contributes to the reduction of the memory capacity.

As described above, according to the third and fourth embodiments, in the case such that the control means responds to only the input of the discrete control amounts, the control means calculates the control amounts by using the detailed control amounts whose discrete value intervals are equal to or less than the above discrete value interval, the control amounts whose discrete value intervals are equal to or less than the above discrete value interval are omitted in the actual calculation of the control amount, and when the integration value of the omitted control amounts is larger than the discrete value interval, the discrete value according to the integration value is fed back for the control amount. Thus, even in the case of controlling by the discrete driving amounts, the control can be performed at a high accuracy.

Further, the fuzzy control apparatus has: the THEN calculating section; the consequent part fuzzy set generating section; the rule combining calculating section; de-fuzzy calculating section; and the discrimination memory section in which the contents of the above calculating processes have been stored and which receives a plurality of fuzzy values and generates the "single-pointed" calculation result. Therefore, there are effects such that not only the fuzzy calculating time is fairly reduced but also the memory capacity can be remarkably reduced as compared with that in the case of constructing the whole fuzzy control section by a memory. It is possible to flexibly cope with the rule construction including the rule conversion.

The fifth embodiment will now be described.

Figure 25:
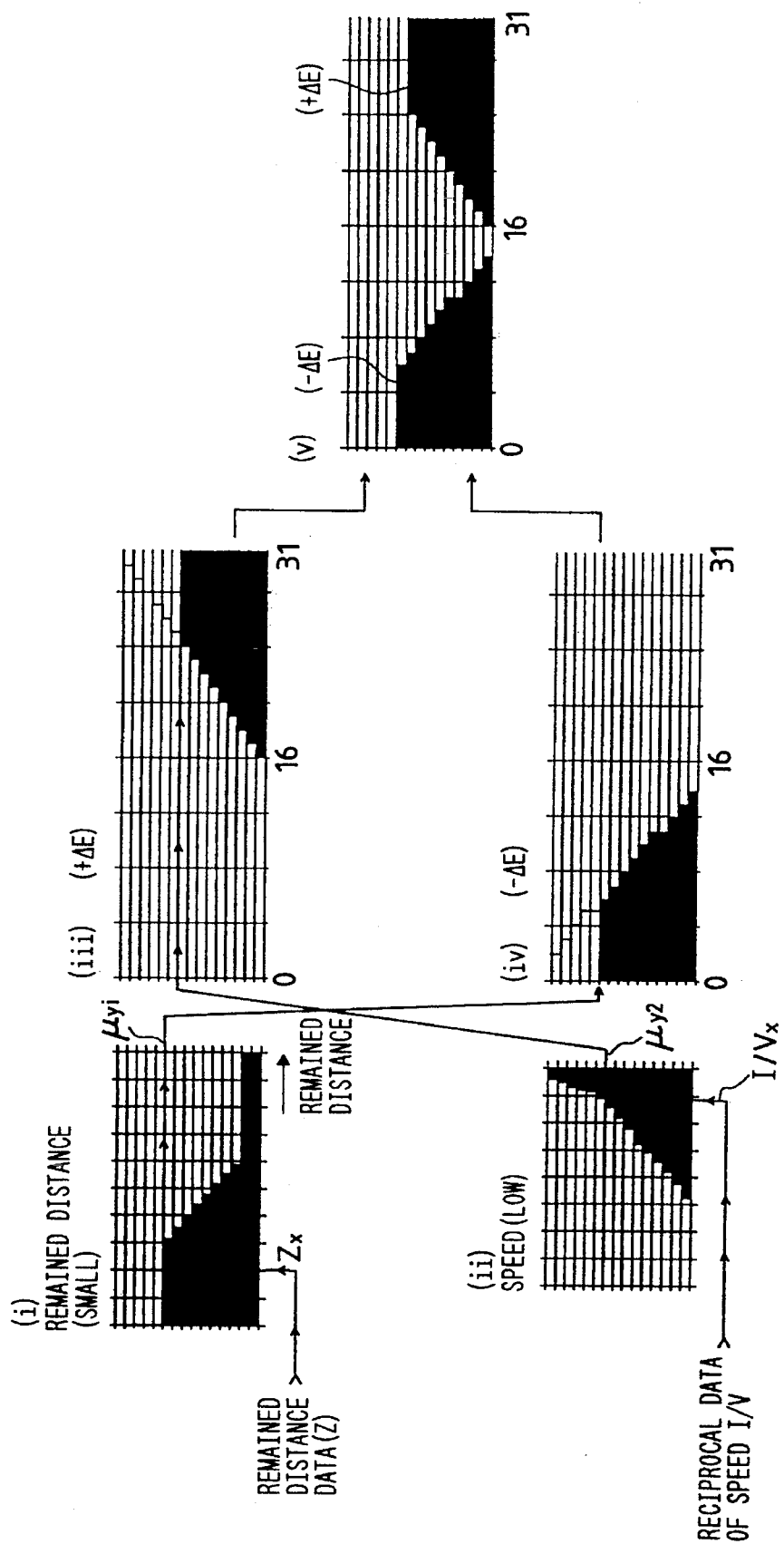
FIG. 25 is an explanatory diagram showing an improved point in the apparatus of FIG. 22.

FIG. 25 is a diagram for explaining a fuzzy driving control algorithm when the remained distance value is small.

In this algorithm, the following inference rules are used.

Rule 1: IF remained distance (small) THEN (−ΔE)

Rule 2: IF speed (low) THEN (+ΔE)

Figure 22:
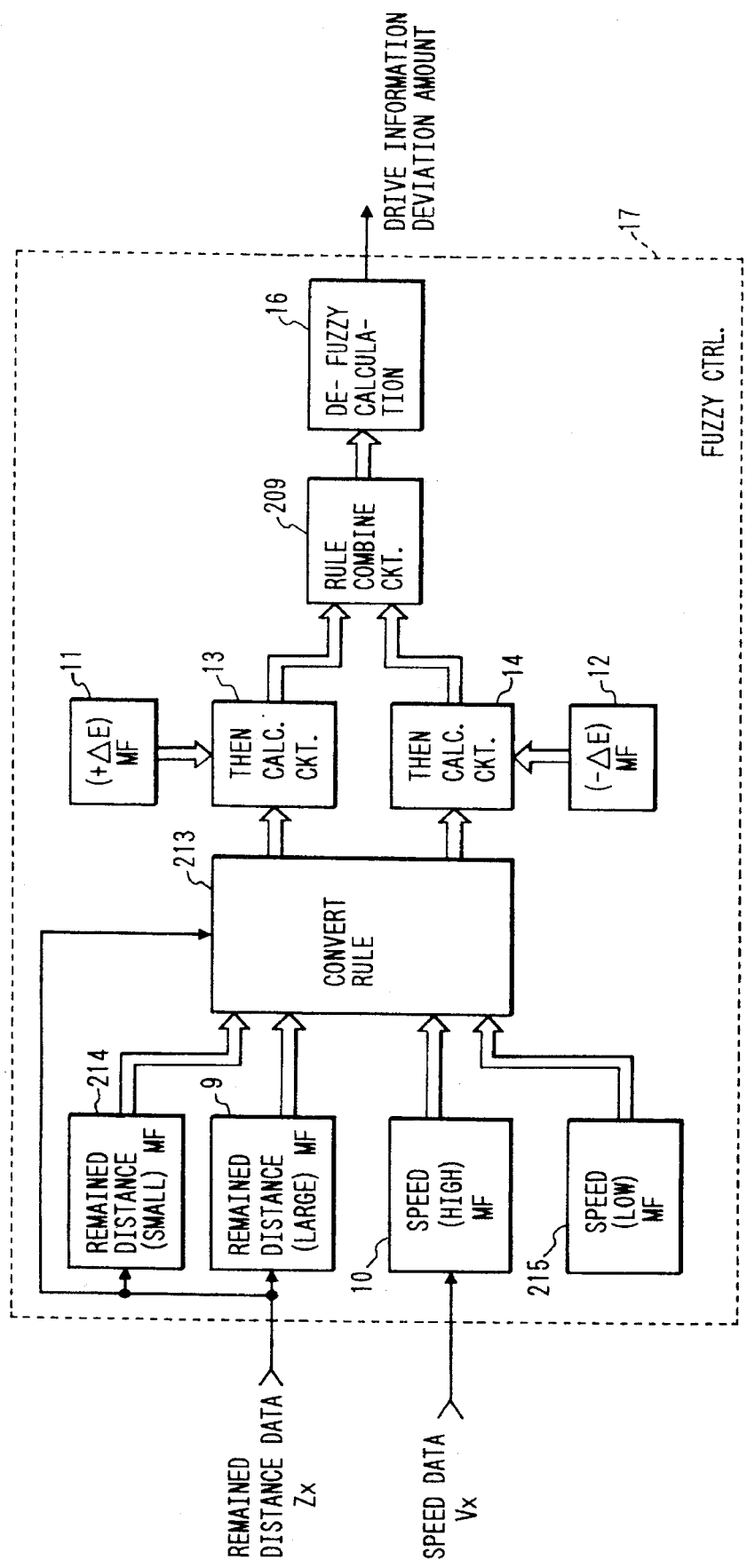
FIG. 22 is a block diagram showing a fuzzy driving control apparatus according to the fifth embodiment of the invention.

In this case, the operations are similar to those in the case of FIG. 1. However, when the remained distance data $Z_x$ is small, the fuzzy value $\mu_{y1}$ contrarily increases. When the speed is low, the fuzzy value $\mu_{y2}$ increases. Therefore, different from the rules shown in FIG. 1 when the remained distance value is small, a fine control can be performed. FIG. 22 shows a fuzzy driving control apparatus utilizing the feature of the above rules. In FIG. 22, the component elements which perform the same operations as those in FIG. 1 are designated by the same reference numerals. The following inference rules are used in the embodiment of FIG. 22.

When remained distance value {large},

Rule 1: IF remained distance (large) THEN (+ΔE)

Rule 2: IF speed (high) THEN (−ΔE)

When remained distance value {small},

Rule 1: IF remained distance (small) THEN (−ΔE)

Rule 2: IF speed (low) THEN (+ΔE)

A mark ( ) denotes a fuzzy set and a mark { } indicates a crisp set.

A fuzzy control apparatus 17 of FIG. 22 is characterized in that a rule converting section 213 to convert the influence rules is provided. The rule Converting section 213 has a function to change the connection to the membership function processing sections (including the THEN calculation circuits) to express (+ΔE) and (−ΔE) between the remained distance {small} and the remained distance {large}. A remained distance (small) MF 214 and a speed (low) MF 215 are membership functions to express the remained distance (small) and the speed (low), respectively. The rule conversion is performed in accordance with the remained distance data value. That is, when the remained distance data value is small, the remained distance (small) MF 214 is connected to the THEN calculation circuit 14 and the speed (low) MF 215 is connected to the THEN calculation circuit 13. When the remained distance data value is large, the remained distance (large) MF 9 is connected to the THEN calculation circuit 13 and the speed (high) MF 10 is connected to the THEN calculation circuit 14.

Figure 23:
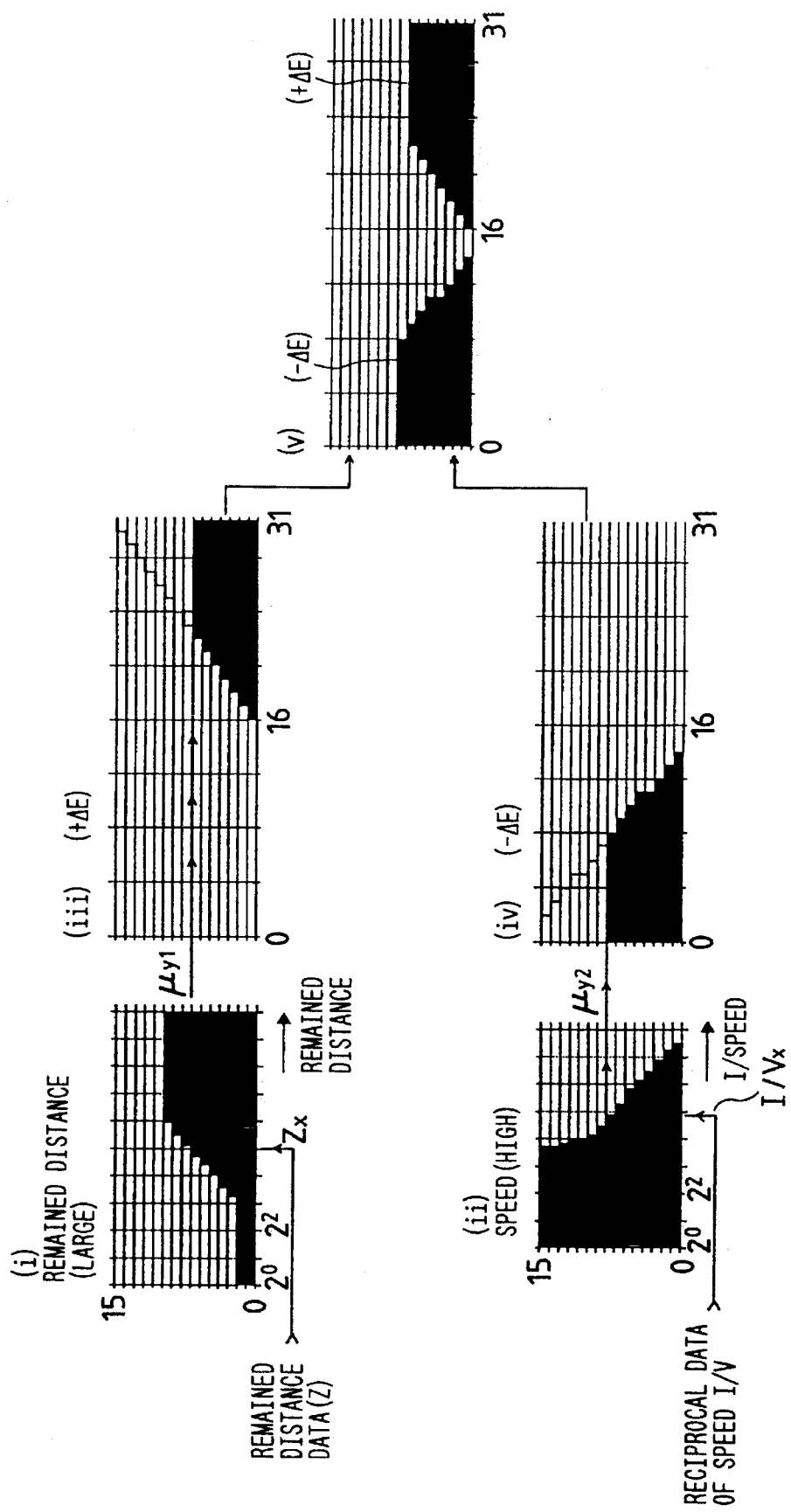
FIG. 23 is an explanatory diagram showing an improved point for the apparatus of FIG. 1.

Therefore, when the remained distance value is small, the control is performed by the algorithm of FIG. 25. When the remained distance value is large, the control is executed by the algorithm of FIG. 23. Consequently, the fine control can be always realized.

Figure 26:
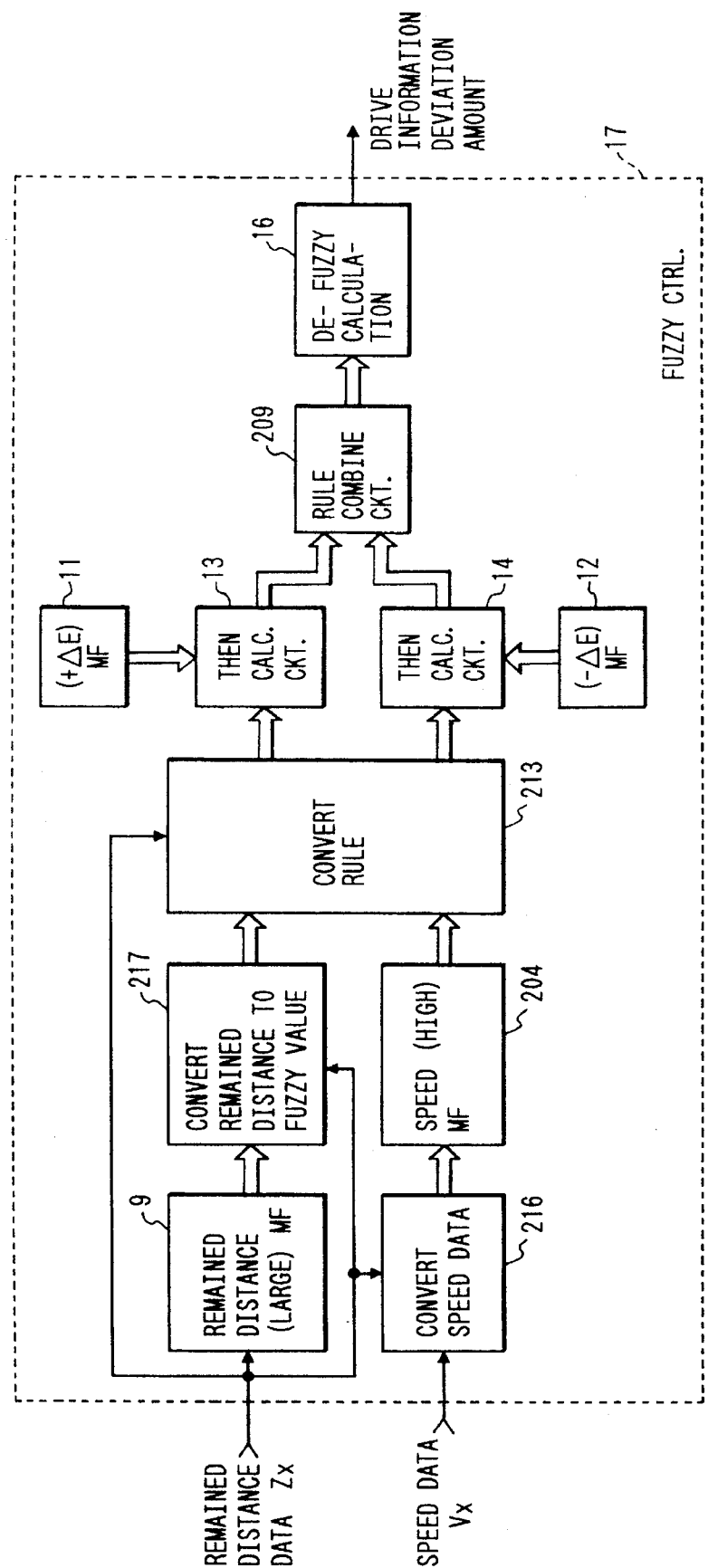
FIG. 26 is a block diagram showing a fuzzy driving control apparatus according to the sixth embodiment of the invention.

FIG. 26 shows the sixth embodiment of the invention. The operation of the sixth embodiment exhibits substantially the same characteristics as those in FIG. 22. The sixth embodiment of FIG. 26 differs from the embodiment of FIG. 22 with respect to a point that a speed data converting section 216 and a remained distance fuzzy value converting section 217 are added in place of the membership functions to express the remained distance (small) and the speed (low). In the case of the remained distance value {large}, the speed data converting section 216 and the remained distance fuzzy value converting section 217 transmit the input data to the post stages as they are. In the case of the remained distance data {small}, however, the speed data converting section executes the calculation as shown by the following equation.

$$\log_2(1/V_x)=11-\log_2(1/V_x)$$

(where, "=" denotes the substitution and indicates a process to newly convert into the reciprocal data of the speed)

In this instance, the remained distance fuzzy value converting section 217 likewise executes the calculation shown by the following equation.

$$\mu_{y1}=12-\mu_{y1}$$

(where, "=" also denotes the substitution)

By the above method, the membership functions indicative of the remained distance (small) and speed (low) shown in FIG. 25 can be expressed without providing those membership functions.

Figure 24A:
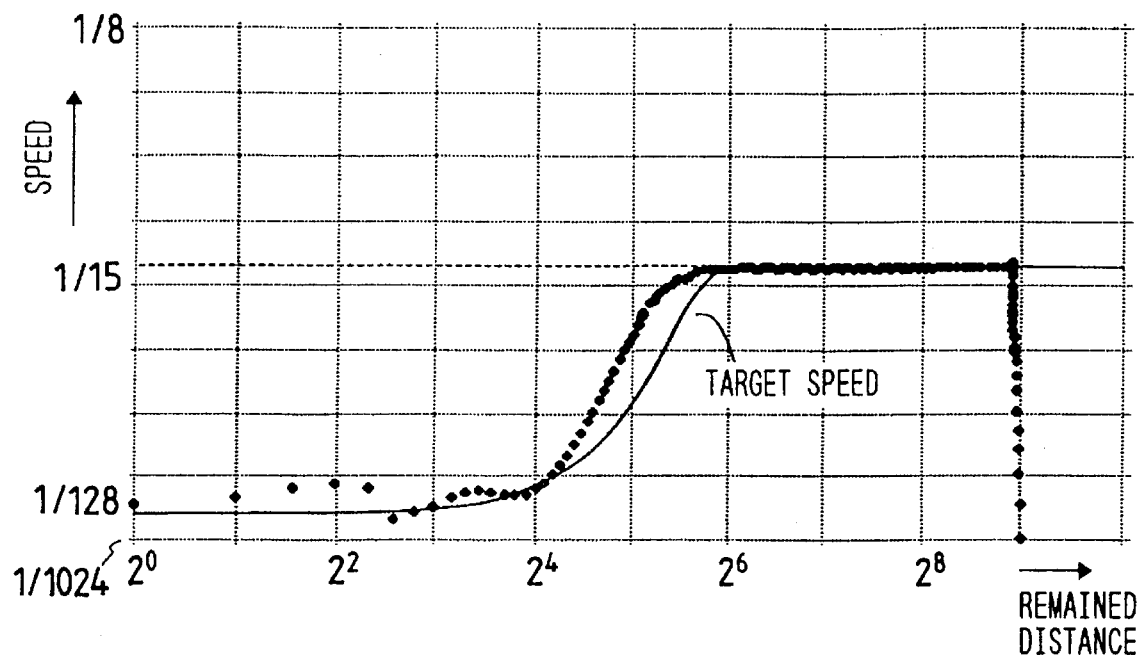
FIGS. 24A and 24B are explanatory diagrams showing the results of experiments of a driving speed pattern.
Figure 24B:
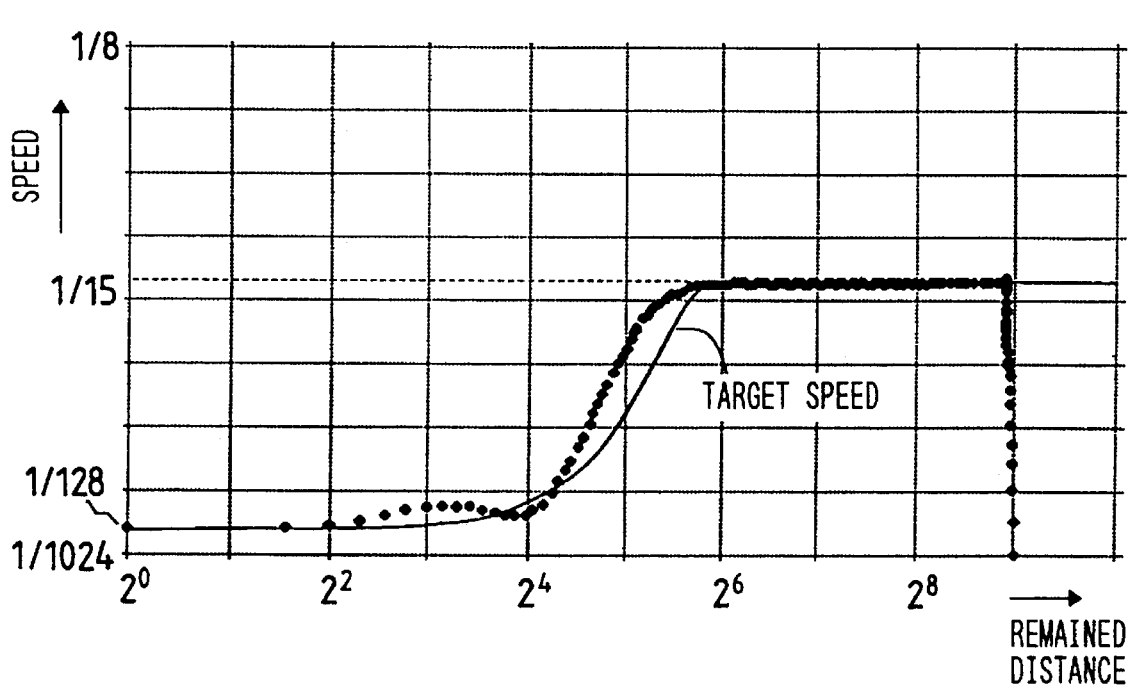

FIG. 24B shows a driving speed pattern which is obtained when the driving experiments have been performed under the same conditions as those in the case of the inference rules of FIG. 1. In this case, the remained distance value {large} and the remained distance value {small} assume "32". When comparing FIGS. 24A and 24B, it will be obviously understood that a speed ripple in the pressure zone of a small remained distance (pressure zone of a low speed) is largely reduced. There is also an effect such that a coincidence degree to the target speed in such a pressure zone is also improved. In addition, when the fuzzy sets which are needed upon conversion of the inference rules are symmetrically constructed with respect to a certain value of the fuzzy value or cardinal value, there is no need to newly provide those sets. Consequently, a large increase in scale due to the embodiment can be avoided.

What is claimed is:

1. A driving apparatus for controlling by a fuzzy inference, comprising:

(a) a driving object;

(b) driving means for driving said driving object;

(c) first detecting means for detecting position information of the driving object, said detecting means detecting a remained distance from a movement target position of said driving object;

(d) second detecting means for detecting a speed corresponding to said remained distance detected by said first detecting means; and (e) control means for controlling said driving means by the following fuzzy inference rules by using said remained distance and said speed;

Rule 1: IF remained distance=(large) THEN (+ΔE)

Rule 2: IF speed=(high) THEN (−ΔE)

wherein (+ΔE) or (−ΔE) denotes a fuzzy set to express a deviation amount of a driving information, (large) denotes a fuzzy set to express that the remained distance is large and (high) denotes a fuzzy set to express that the speed is high.

2. An apparatus according to claim 1, wherein said driving means uses a motor as a driving source.

3. An apparatus according to claim 2, wherein said first detecting means subtracts said remained distance from a target distance each time the movement of a unit movement distance of said driving object is detected.

4. A driving apparatus for controlling by a fuzzy inference, comprising:

(a) a driving object;

(b) driving means for driving said driving object;

(c) first detecting means for detecting position information of the driving object, said detecting means detecting a remained distance from a movement target position of said driving object;

(d) second detecting means for detecting a speed corresponding to said remained distance detected by said first detecting means; and (e) control means for controlling said driving means by the following fuzzy inference rules by using said remained distance and said speed;

Rule 1: IF remained distance=(small) THEN ($-\Delta E$)

Rule 2: IF speed=(low) THEN ($+\Delta E$)

wherein ($+\Delta E$) or ($-\Delta E$) denotes a fuzzy set to express a deviation amount of a driving information, (small) denotes a fuzzy set to express that the remained distance is small and (low) denotes a fuzzy set to express that the speed is low.

5. An apparatus according to claim 4, wherein said driving means uses a motor as a driving source.

6. An apparatus according to claim 5, wherein said first detecting means subtracts said remained distance from a target distance each time the movement of a unit movement distance of said driving object is detected.

7. A driving apparatus for controlling by a fuzzy inference, comprising:

(a) a driving object;

(b) driving means for driving said driving object;

(c) control means for controlling said driving means by the following plurality of fuzzy inference rules:

Rule $_n$: IF $R_{Fn}$ THEN $R_{Rn}$ wherein $R_{Fn}$ denotes a plurality of front rules and $R_{Rn}$ indicates a plurality of rear rules and n is an integer and indicates the rule number, wherein a stationary state is obtained only when two or more number among a plurality of fuzzy values as results of said plurality of front rules are equal, said control means including means for converting said front rules $R_{Fn}$ and said rear rules $R_{Rn}$ so as to prevent that the fuzzy values as results of said front rules which contribute to said stationary state are equal to or less than said certain value, wherein fuzzy sets included in said front rules $R_{Fn}$ and said rear rules $R_{Rn}$ after completion of the conversion of the inference rules are made symmetrical to corresponding fuzzy sets before said conversion of the inference rules with respect to a certain value of the fuzzy value or cardinal value.

8. A control apparatus for controlling by a fuzzy inference, comprising:

controlling means for controlling a control object by supplying a discrete control value to said control object and for controlling by one or a plurality of fuzzy inference rules comprising fuzzy sets, said control means including calculating means for calculating a control value according to said fuzzy inference rules;

supplying means for supplying said control value to said control object, said supplying means supplies a value as said control value of which an amount less than a discrete value interval is omitted from the calculating values calculated by said calculating means to said control object;

integrating means for integrating said omitted values; and feed back means for feeding back the integration value as said control value when the integration value exceeds the discrete value interval.

9. A control apparatus for controlling by fuzzy inference, comprising control means for controlling a control object by using a plurality of fuzzy inference rules, said control means comprising:

a first memory for storing a predetermined result of a fuzzy inference calculation process to an input of a plurality of fuzzy values, the fuzzy inference calculation process comprising the steps of (1) "THEN" calculating the plurality of fuzzy values and a plurality of rear rule fuzzy sets to generate the plurality of fuzzy inference rules, (2) combining the plurality of fuzzy inference rules to generate rule combined data, and (3) de-fuzzy calculating the rule combined data to generate the predetermined result, the first memory directly outputting the predetermined result when the plurality of fuzzy values are input; and a second memory for storing a front rule fuzzy set generated by a front rule fuzzy set generating section from the predetermined result.

10. An apparatus according to claim 1, wherein the fuzzy set ($+\Delta E$) is information for increasing a driving energy and the fuzzy set ($-\Delta E$) is information for decreasing the driving energy.

11. An apparatus according to claim 4, wherein the fuzzy set ($+\Delta E$) is information for increasing a driving energy and the fuzzy set ($-\Delta E$) is information for decreasing the driving energy.

12. An apparatus according to claim 1 or claim 10, wherein Rule 1 is a rule for obtaining data having a quantity which deviates a driving energy for said driving means toward a increasing direction in accordance with the remained distance and Rule 2 is a rule for obtaining data having a quantity which deviates the driving energy toward a decreasing direction in accordance with the speed.

13. An apparatus according to claim 4 or claim 11, wherein Rule 1 is a rule for obtaining data having a quantity which deviates a driving energy for said driving means toward a decreasing direction in accordance with the remained distance, and Rule 2 is a rule for obtaining data having a quantity which deviates the driving energy toward a increasing direction in accordance with the speed.

\* \* \* \* \*

UNITED STATES PATENT AND TRADEMARK OFFICE
CERTIFICATE OF CORRECTION

PATENT NO. : 5,600,553

DATED : February 4, 1997

INVENTOR(S) : SOMEI KAWASAKI, ET AL.

Page 1 of 2

It is certified that error appears in the above-identified patent and that said Letters Patent is hereby corrected as shown below:

TITLE PAGE:

AT [56] REFERENCES CITED

OTHER PUBLICATIONS

"Predictive Industrial ... Book (North" should read --Predictive Fuzzy Control," Industrial Applications of Fuzzy Control; Elsevier Science Publishers B.V. (North--.

AT [57] ABSTRACT

Line 12, "$(-\Delta E)$" should read --$(+\Delta E)$--.

COLUMN 1

Line 16, "an" should read --a--.

COLUMN 7

Line 50, "$(-\Delta E)$" should read --$(+\Delta E)$--; and
Line 53, "$(+\Delta E)$" should read --$(-\Delta E)$--.

COLUMN 8

Line 31, "and" (second occurrence) should read --in--.

COLUMN 14

Line 40, "speed;" should read --speed:--; and
Line 67, "speed;" should read --speed:--.

UNITED STATES PATENT AND TRADEMARK OFFICE
CERTIFICATE OF CORRECTION

PATENT NO. : 5,600,553

DATED : February 4, 1997

INVENTOR(S) : SOMEI KAWASAKI, ET AL.

It is certified that error appears in the above-identified patent and that said Letters Patent is hereby corrected as shown below:

COLUMN 15

Line 25, "number" should read --numbers--.

COLUMN 16

Line 38, "a" should read --an--; and
Line 48, "a" should read --an--.

Signed and Sealed this

Second Day of September, 1997

*Attest:*

BRUCE LEHMAN

*Attesting Officer*     *Commissioner of Patents and Trademarks*